(12) United States Patent
Rossi

(10) Patent No.: US 9,994,453 B2
(45) Date of Patent: Jun. 12, 2018

(54) PROCESS AND SYSTEM FOR PRODUCING COMMERCIAL QUALITY CARBON DIOXIDE FROM RECAUSTICIZING PROCESS CALCIUM CARBONATES

(71) Applicant: Robert A. Rossi, North Bergen, NJ (US)

(72) Inventor: Robert A. Rossi, North Bergen, NJ (US)

( * ) Notice: Subject to any disclaimer, the term of this patent is extended or adjusted under 35 U.S.C. 154(b) by 0 days. days.

(21) Appl. No.: 15/003,984

(22) Filed: Jan. 22, 2016

(65) Prior Publication Data

US 2016/0207778 A1 Jul. 21, 2016

Related U.S. Application Data

(63) Continuation of application No. 14/488,626, filed on Sep. 17, 2014, now Pat. No. 9,272,912, which is a continuation-in-part of application No. 11/895,440, filed on Aug. 24, 2007, now Pat. No. 8,865,101.

(Continued)

(51) Int. Cl.
*B01J 8/26* (2006.01)
*B01J 6/00* (2006.01)
(Continued)

(52) U.S. Cl.
CPC ............. *C01B 31/20* (2013.01); *B01J 6/001* (2013.01); *B01J 8/26* (2013.01); *C01B 32/50* (2017.08);
(Continued)

(58) Field of Classification Search
CPC .... B01J 8/26; B01J 6/002; B01J 6/001; F23C 10/04; F23C 10/08
See application file for complete search history.

(56) References Cited

U.S. PATENT DOCUMENTS 3,488,280 A   1/1970   Schulman ...................... 208/419
3,961,903 A   6/1976   Nielsen et al. ................ 422/193
(Continued)

FOREIGN PATENT DOCUMENTS

JP   62235407 A   10/1987   ............... C21C 5/38

OTHER PUBLICATIONS

Glazer et al. "Alkali Metals in Circulating Fluidized Bed Combustion of Biomass and Coal: Measurements and Chemical Equilibrium Analysis", Energy & Fuels 2005, 19, 1889-1897.
(Continued)

*Primary Examiner* — Lessanework Seifu
(74) *Attorney, Agent, or Firm* — Mauriel Kapouytian Woods LLP; J. David Smith

(57) ABSTRACT

Methods and systems are described for recovering carbon dioxide, for producing commercial quality carbon dioxide ($CO_2$) of 90% to +99% purity using, wet calcium carbonate lime mud produced in a recausticizing process that also produces caustic soda, for instance, Kraft paper pulp mill lime mud (a.k.a., "lime mud") as a feedstock to a multi-stage lime mud calcination process. High reactivity, high-quality calcined lime mud (a.k.a. re-burned lime, or calcine), required in the Kraft paper pulp mill's recausticizing process is also produced, and superheated high pressure steam and hot boiler feed-water is generated and exported to the mill's steam distribution and generation system as well as hot process water for use in the mill's manufacturing operation. The system for calcining calcium carbonate lime mud produced from a recausticizing manufacturing operation and converting it to calcined lime mud and $CO_2$ comprises a calciner and a combustor linked by a moving media heat transfer (MMHT) system or apparatus. The MMHT system or apparatus thermally links separate fluid bed combustion (exothermic) and calcination (endothermic) stages with a
(Continued)

solid particulate media. The system further comprises a flash dryer or spray dryer that utilizes exhausted enthalpy from the calcination stage.

3 Claims, 5 Drawing Sheets

(60) Provisional application No. 60/840,319, filed on Aug. 25, 2006.

(51) Int. Cl.
*C04B 2/10* (2006.01)
*C01B 31/20* (2006.01)
*C01B 32/50* (2017.01)
*C04B 2/06* (2006.01)
*C04B 2/08* (2006.01)
*C01F 11/06* (2006.01)

(52) U.S. Cl.
CPC ............. *C01F 11/06* (2013.01); *C04B 2/06* (2013.01); *C04B 2/08* (2013.01); *C04B 2/10* (2013.01); *C04B 2/108* (2013.01); *Y02P 20/129* (2015.11); *Y02P 40/42* (2015.11); *Y02P 40/45* (2015.11)

(56) References Cited

U.S. PATENT DOCUMENTS

| | | | |
|---|---|---|---|
| 4,212,651 A | 7/1980 | Eissenberg et al. | 44/622 |
| 4,240,377 A | 12/1980 | Johnson | |
| 4,338,887 A | 7/1982 | Leon | 122/4 D |
| 4,389,381 A | 6/1983 | Dinovo | 423/175 |
| 4,409,416 A | 10/1983 | Snell et al. | 585/635 |
| 4,548,796 A | 10/1985 | Weber | |
| 4,631,025 A | 12/1986 | Casper et al. | |
| 4,693,682 A | 9/1987 | Lee et al. | |
| 4,707,350 A * | 11/1987 | Baudequin | C04B 2/10 165/104.16 |
| 4,748,010 A | 5/1988 | Walker | 423/176 |
| 4,823,712 A | 4/1989 | Wormer | |
| 4,962,279 A * | 10/1990 | Anderson | B01J 6/001 106/486 |
| 5,510,085 A | 4/1996 | Abdulally | 422/142 |
| 5,711,802 A | 1/1998 | Theil | |
| 5,715,764 A | 2/1998 | Lyngfelt et al. | 110/245 |
| 5,772,937 A | 6/1998 | Cohen et al. | 264/117 |
| 5,824,244 A | 10/1998 | Kelly et al. | |
| 6,685,902 B2 | 2/2004 | Morin et al. | 423/244.01 |
| 2002/0021994 A1 | 2/2002 | Blue et al. | 423/224 |

OTHER PUBLICATIONS

Pifer. "Bubbling Fluidized-Bed Technology Serves Combustion Need for Biomass", Jan. 2005. ☐☐ ☐☐ Source: http://findarticles.com/p/articles/mi_qa3636/is_/ai_n9477176.

Perez et al. "Aluminum and silicon co-deposition by the chemical vapor deposition in fluidized bed reactor technique as a precursor of protective coatings of mullite", Surface and Coating Technology, 184 (2004) 361-369.

Wolpert "Motala Energi Investment in Biomass and Fluidized-bed technology", Applied Energy, 55(1), 65-68, 1996.

* cited by examiner

PROCESS AND SYSTEM FOR PRODUCING COMMERCIAL QUALITY CARBON DIOXIDE FROM RECAUSTICIZING PROCESS CALCIUM CARBONATES

CROSS REFERENCE TO RELATED APPLICATIONS

The present application is a continuation in part of U.S. Ser. No. 11/895,440, filed Aug. 24, 2007, which is a non-provisional application claiming the priority of provisional application Ser. No. 60/840,319, filed Aug. 25, 2006, the disclosures of which are incorporated by reference herein in their entireties. Applicants claim the benefits of application Ser. No. 60/840,319 under 35 U.S.C. § 119(e).

FIELD OF THE INVENTION

The present invention provides methods and systems for producing high quality carbon dioxide ($CO_2$) of, for instance, 90% to +99% purity. Further, the present invention provides an improved process for calcining calcium carbonates or "lime mud" as produced in, for instance, a Kraft paper pulp mill or other alkali-based manufacturing operations that utilize a recausticizing process to produce caustic soda. Such lime mud may be converted to commercial grade $CO_2$ and high-quality calcined lime mud (re-burned lime, or calcine), using only low, or negative cost "carbon-neutral" fuels such as biomass and biomass derived negative cost waste-water treatment plant (WWTP) sludge, non-condensable waste mill gas (NCG), or low cost solid fuels such as coal, petroleum coke, etc. with the co-production of superheated high-pressure steam. The present invention also applies to recausticizing process calcium carbonates as produced in the aluminum industry or by the capture of $CO_2$ from air.

BACKGROUND OF INVENTION

The major market regions for liquid $CO_2$ are the United States, Western Europe, and Japan with the United States being the largest consumer. The major $CO_2$ end-use is for food processing and carbonated beverage production.

$CO_2$ is usually recovered as a byproduct from bioethanol production and catalytic steam reformation of natural gas followed by the water-shift reaction to produce anhydrous ammonia. In the United States, there is increasing $CO_2$ availability from bioethanol production due to the need for "green" transport fuels.

New bioethanol $CO_2$ sources are increasingly located west of the Mississippi River due to corn feedstock availability, whereas significant liquid $CO_2$ demand is in the densely populated Northeastern, Southeastern, and Southern states.

Most of the Kraft paper pulp mills in the United States are located in proximity to regions of high liquid $CO_2$ demand. It would be beneficial if new $CO_2$ producing sources could be created within these high need regions.

Further, many global paper mills have Precipitated Calcium Carbonate (PCC) "satellite plants" that supply this important paper filler to papermakers. PCC production requires carbonating industrial slaked lime using $CO_2$ contained in adjacent pulp mill lime mud calciner off-gases or paper mill boiler stack gases. There are supply reliability, quality, and cost issues associated with this approach such that a more reliable, higher quality and consistent $CO_2$ feedstock source would be attractive.

Also, there is a growing need for $CO_2$ within Kraft paper pulp mills to precipitate organic lignins from aqueous "black liquor" fuel streams normally supplied to the mill's chemical recovery boiler. This de-bottlenecks the boiler while creating a valuable, new carbon-neutral biomass derived fuel that can displace fossil fuels.

The Kraft pulp and paper industry is also a major energy consumer, with the majority of that need being met by low cost, carbon-neutral, biomass and biomass related fuels. The conventional lime mud calcination process has, however, not easily been converted to biomass fuels and remains a conspicuous consumer of high cost, global warming fossil fuels. In the United States, there are many Kraft paper pulp mills rated at approximately 1000 air dried tons per day (adtpd) bleached pulp production with each requiring about 320 tpd of calcined lime mud production at an annual natural gas and oil consumption of approximately 625 billion Btus. At 2014 energy prices this is approximately US $2.5 million per year per 1000 adtpd Kraft pulp mill.

It would also be useful to regenerate concentrated $CO_2$ from more dilute $CO_2$ sources as the need for large scale "greenhouse-gas" capture and sequestration projects develops. One capture process (www.carbonengineering.com) utilizes sodium or potassium hydroxides to capture dilute $CO_2$ from ambient air and could benefit from the regeneration of concentrated $CO_2$ from recausticizing process calcium carbonate.

The Bayer process that produces "pot-line grade" alumina feedstock from bauxite ore for aluminum metal production consumes significant amounts of caustic soda and rejects large amounts of caustic contaminated gangue known as "red mud". Technology developed by Alcoa utilizes $CO_2$ to neutralize this caustic contaminant and reduce land fill pollution could benefit from the present invention.

In the Kraft paper pulping process, cellulosic wood chips are mixed with aqueous cooking liquor (a.k.a. "white liquor") composed primarily of sodium hydroxide (NaOH), sodium sulfide ($Na_2S$), sodium carbonate ($Na_2CO_3$) and sodium sulfite ($Na_2SO_3$). This mixing occurs in a "digester" vessel at a temperature and pressure satisfactory to separate the cellulosic fiber from the natural lignins that bind such fibers.

The liberated fiber is separated from the resultant "black liquor" and is subsequently washed, bleached (or remains unbleached) and is eventually transformed into numerous paper grades.

The separated black liquor contains, aside from the original white liquor chemicals, lignins and other organic matter that previously bound the cellulosic fiber. In order to recover and recycle these costly pulping chemicals, as well as produce valuable steam and power from the contained organic lignins, the black liquor is concentrated in multiple-effect evaporators and delivered as a concentrated fuel to a chemical recovery boiler.

This chemical recovery boiler combusts the organics under unique oxidizing/reducing conditions to produce both superheated high-pressure steam and a molten inorganic ash ("smelt") consisting primarily of $Na_2S$ and $Na_2CO_3$. The co-produced high-pressure steam is subsequently exhausted via a steam turbine/generator to produce mill power and low-pressure process steams.

The smelt is drained from the chemical recovery boiler and quenched in water to create "green liquor." This green liquor is subsequently clarified and filtered to remove insoluble impurities whereupon it is delivered to the "slakers" to initiate conversion of the dissolved $Na_2CO_3$ into NaOH required for the white liquor. This slaking process utilizes calcium oxide CaO (a.k.a. calcined lime mud, or re-burned lime, or calcine) to convert $Na_2CO_3$ into NaOH via the following two consecutive reactions:

$$CaO_{(s)} + H_2O \rightarrow Ca(OH)_{2(s)} \quad \quad 1)$$

$$Na_2CO_{3(aq)} + Ca(OH)_{2(s)} \rightarrow 2NaOH_{(aq)} + CaCO_{3(s)} \quad \quad 2)$$

The slaker product slurry, consisting of all the chemicals involved in reactions 1 and 2, is fed to subsequent recausticizers where reaction 2 nearly proceeds to completion with some residual $Na_2CO_3$ remaining in the white liquor. The resultant white liquor mix of NaOH, $Na_2S$, $Na_2CO_3$, and $Na_2SO_3$ is physically separated from the precipitated calcium carbonate ($CaCO_3$), or "lime mud" and recycled to the digester to initiate the pulping process.

The lime mud is further water washed and filtered to recover as much white liquor as economically possible before being fed to a rotary kiln calciner which converts the lime mud into calcined lime mud, (CaO and impurities) for recycle to the slakers. During the washing/filtering process, trace amounts of residual $Na_2S$ are air oxidized into more stable sodium thiosulfate ($Na_2S_2O_3$) to reduce noxious total reduced sulfur (TRS) compounds which can be created in and emitted by the rotary kiln.

The highly endothermic lime mud calcination reaction typically occurs in a rotary kiln, although fluidized bed calciners have also been utilized. Use of an external lime mud flash drying (LMD) process, when combined with the rotary kiln, creates the current "state-of-the-art" optimized energy consuming lime mud calcination process.

The first fluidized bed ("FluoSolids") lime mud calcination process was commercially introduced in 1963. It initially gave significant competition to rotary kilns due to its relatively lower fuel consumption, higher product quality, and compactness. It fell into disuse, however, as rotary kiln/LMD technology re-captured the fuel economy lead and FluoSolids installations experienced operability issues and an inability to economically operate at the high unit capacities required by a "world-class" Kraft paper pulp mill.

The kiln's primary endothermic ($T_R=25°$ C.) calcination reaction is:

$$CaCO_{3(s)} \rightarrow CaO_{(s)} + CO_{2(g)}; \Delta H_{IX} = 42.5 \text{ Kcal/gm mole} \quad \quad 3)$$
$$(891,764 \text{ Kcal/mt CaO})$$

The rotary kiln calcines the mud between 1000° C. (1832° F.) and 1200° C. (2192° F.) and at $CO_2$ partial pressures well below the atmospheric pressure equilibrium concentration for these temperatures. This produces a calcined lime mud having the best physiochemical properties suitable for subsequent slaking and efficient recausticizing.

Due to the high calcination temperatures, and so to not contaminate and/or upset the recausticizing process with inorganic impurities, either high-cost oil and/or natural gas fuels are utilized as kiln fuel. Low-cost solid fuels such as biomass, waste water treatment plant (WWTP) sludge, coal etc. are typically not used due to their contaminating ash content. WWTP sludge and biomass have the added penalty of lower adiabatic flame temperature due to the high water content.

Accordingly, while many energy-intensive pulp mill operations have converted to low-cost waste and biomass fuels for energy production since the 1970s, the rotary kiln remains a conspicuous consumer of premium liquid and gaseous fuels. While advances have been made to reduce this premium fuel consumption, it still remains between 1.4 (with LMD) and 1.7 million Kcal/metric ton calcined lime mud dependent on initial mud moisture content, calciner capacity, fuel type, product lime availability, and installed energy conservation features.

Due to various limitations, attaining future significant fossil fuel consumption and cost reductions in the rotary kiln/LMD calcination process appears difficult. There is, however, wasted energy within the rotary kiln/LMD calcination process that could be recovered with the proper technical approach. Notably, at higher lime mud solids concentration the calciner's exit gas temperature increases. If a counter-current heat transfer process (i.e. a rotary kiln) were thermally balanced the exit gas temperature would remain constant as fuel input was reduced to compensate for the decreased water input.

Further energy efficiency improvement, however, is not likely with the rotary kiln/LMD calcination process since a very large non-variable fuel amount is required to compensate for constant radiation losses, provide the constant endothermic heat-of-reaction enthalpy, and also heat reaction products (CaO and $CO_2$) to the calcination temperature. This non-variable fuel input has associated gaseous fuel combustion products from which enthalpy is recovered via counter-current contact with dry lime mud solids in the kiln pre-heat section using densely packed hanging chains as heat transfer surface. This preheats the dry lime mud before it enters the following kiln calcination stage.

The reduced temperature gaseous combustion products (and released $CO_2$) leave the kiln pre-heat section and enter the kiln drying section where these gases' enthalpy content evaporates incoming lime mud water content. Older kilns have chains within the kiln drying section to improve gas-to-water heat transfer. Newer kilns with an LMD do not have drying section chains and are easier to control and operate. As previously stated, as lime mud solids content increases the need for drying enthalpy decreases. The following kiln pre-heat section, however, has insufficient chain heat transfer ability to absorb available enthalpy from the combustion products and $CO_2$ associated with the aforementioned non-variable fuel component and transfer it into the dried solids entering from the drying zone. The unabsorbed enthalpy associated with the combustion products and $CO_2$ results in a higher LMD outlet gas temperature when high solids lime mud is the feedstock. Over the last forty years, improvements in lime mud filtration and washing have increased filter cake solids content from 70% to over 85%, resulting in significant fuel savings and improved white liquor recovery. Unfortunately, the current rotary kiln/LMD technology is limited in the ability to economically respond to this fuel saving opportunity and will become less fuel-efficient as filter cake solids content further increases.

The less utilized FluoSolids fluidized bed calcination process never featured a solids pre-heat section, and wastefully dissipated this excess available enthalpy via a water spray cooler to control lime mud flash dryer operating temperature. Designs have also been proposed to address this dilemma by inserting a waste heat boiler in place of the spray cooler step, but were never commercialized, most likely due to the high surface fouling characteristics of calciner exit gas caused by the presence of low eutectic melting point mixtures of $Na_2CO_3$ and sodium $Na_2SO_4$. The $Na_2SO_4$ is created by the oxidation of $Na_2S_2O_3$ and $Na_2S$ in the air fluidized calciner.

It would, therefore, be beneficial to provide a process whereby gaseous fuel combustion products could be separated from gaseous calcination reaction products ($CO_2$) such that the excess enthalpy contained in the combustion products could be viably extracted as superheated high pressure steam without the presence of heat transfer fouling mixtures such as $Na_2CO_3/Na_2SO_4$. This is not possible within the body of a rotary kiln however the disclosed invention, with separated combustion and calcination stages, addresses this need.

Concurrent with these enthalpy utilization optimization needs, all mills must control the amount and toxicity of gaseous, liquid, and solid wastes expelled. Many of these emissions have been reduced or eliminated thanks to better manufacturing practices but WWTP sludge (cellulosic, organic, and inorganic matter from waste water treatment) remains a costly disposal problem since it must ultimately be placed in a landfill. As previously discussed, WWTP sludge cannot be used in existing rotary kiln representing a lost opportunity to conserve fossil fuels.

Safe disposal of non-condensable waste mill gas (NCGs), which are typically combusted in the recovery or power boiler, or more likely, the rotary kiln lime mud calciner is another Kraft paper pulp mill operability issue. While NCG combustion in rotary kilns has been widely practiced, operability problems (kiln deposit "ringing", $SO_2$ "blow-through", etc.) persist at many mills. Accordingly, stand alone NCG incinerators with waste heat boilers that raise steam and scrub sulfurous emissions are increasingly used. These incinerators/boilers, however, are not always available when NCGs are produced, so a back-up disposal means is desirable.

Numerous advances have been previously made related to various aspects of lime mud and limestone calcination and related materials. U.S. Pat. No. 2,212,446 teaches limestone calcination in a 100% steam atmosphere (a claim of the disclosed invention) using an indirect heated rotary calciner. U.S. Pat. No. 2,700,592 teaches using moving media heat transfer (MMHT) between an endothermic fluidized bed process and an exothermic fluidized bed sulfide ore roasting process. U.S. Pat. No. 2,738,182 teaches fluidized bed calcination of Kraft pulp mill lime mud including recycling finely ground calcined lime mud product into a calciner bed to control agglomeration. U.S. Pat. No. 3,961,903 teaches a spray dryer to dry lime mud using multiple hearth calciner off-gases as the drying medium prior to feeding the dried mud to the calciner. U.S. Pat. No. 3,991,172 teaches direct combustion products calcination of fine limestone by passing the limestone through a fluidized bed of a "granular heat carrier medium". U.S. Pat. No. 4,321,239 teaches using multiple spray dryers to dry lime mud using multiple hearth calciner off-gases as the drying medium prior to feeding the dried lime mud to a calciner. U.S. Pat. No. 4,389,381 teaches using MMHT by passing fine limestone through an inert heat carrier contained in an endothermic fluidized bed and using a coal fueled exothermic fluidized bed to re-heat the heat carrier. Ash is separated from the re-heated heat carrier prior to calcination. Calcination is accomplished in an air atmosphere of unspecified composition. U.S. Pat. No. 4,606,722 teaches a solid fuel gasified external to a rotary kiln lime mud calciner with the syngas used as calciner fuel. A vitrified gasifier ash is mixed with calcine and removed in the slaker. U.S. Pat. No. 4,631,025 teaches direct injection of a solid fuel (petroleum coke) into a fluidized bed lime mud calciner. U.S. Pat. No. 4,707,350 teaches calcination of fine limestone in an electrically heated fluid bed calciner fluidized in a 100% $CO_2$ atmosphere with recovered $CO_2$ as the fluidizing gas. U.S. Pat. No. 4,760,650 teaches indirect steam heated drying of lime mud in a steam atmosphere prior to feeding the dried lime mud into a fluid bed calciner. The steam is generated from calciner off-gas. U.S. Pat. No. 5,110,289 uses a separate flash dryer to dry Kraft paper pulp mill lime mud using rotary calciner off-gases as the drying medium. U.S. Pat. No. 5,230,880 teaches calcination of fine limestone in an electrically heated fluid bed calciner fluidized in an air atmosphere. The fine limestone is passed through a bed of coarser calcined limestone particles that act as a heat transfer media between the fine limestone and the electric heaters. U.S. Pat. No. 5,354,375 describes a lime mud calcination process using a shaft kiln to process pelletized lime mud in a counter-current fashion using direct firing of oil or natural gas fuel. U.S. Pat. No. 5,378,319 describes a lime mud calcination process using an electrically heated microwave belt oven to process lime mud in a counter-current fashion using a counter-current air sweep. U.S. Pat. No. 5,644,996 teaches a technique to cool freeboard gases in a fluidized bed lime mud calciner to below 500° C. (932° F.) to minimize freeboard scaling when the calciner fluid bed is between 875° C. (1607° F.) and 1000° C. (1832° F.). The injected coolant is the entire amount of wet lime mud. U.S. Pat. No. 5,653,948 teaches an indirectly heated fluid bed calciner using electricity or oil/gas firing to calcine very fine limestone particles. The limestone is injected beneath a coarser limestone bed that acts as the heat transfer medium. U.S. Pat. No. 5,711,802, teaches a technique to reduce the LMD inlet gas temperature from a rotary kiln lime mud calciner to between 400° C. (752° F.) and 600° C. (1112° F.); that eliminates dryer scaling and reduces kiln dust carry-over. United States Patent Application Publication No. 2006/0039853 teaches a process to separate $CO_2$ from utility boiler stack gases with an "activated" CaO sorbent and then separately re-generating the sorbent and recovering the $CO_2$ in a steam blanketed vacuum calciner.

SUMMARY OF THE INVENTION

In a first aspect, the present invention provides a method for recovering carbon dioxide by
(a) providing wet calcium carbonate lime mud sufficiently near a bubbling fluid bed calciner and a spray dryer or flash dryer such that the calciner and flash dryer or spray dryer operate in counter/current gas/solids flow wherein exiting calciner gases substantially dry the wet lime mud and the resulting dry lime mud is fed to the calciner;
(b) feeding substantially dry lime mud to the fluid bed calciner wherein the fluid bed calciner is thermally linked by moving media heat transfer (MMHT) to a circulating fluid bed combustor by a heat transfer media wherein said media moves between said calciner and said combustor wherein MMHT provides heat input for calcination;
(c) recycling the heat transfer media from the calciner to the combustor; and
(d) recovering excess energy from the process of c) generating superheated high pressure steam;
(e) recovering carbon dioxide and calcined lime mud from the fluid bed calciner; and, optionally
(f) exporting the superheated high pressure steam.

The method may further feature removing substantially all ash from the heat transfer media, for instance, after (b). In some instances, the combustor receives one or more fuels such as, for instance, Kraft pulp and paper mill sludge, biomass, precipitated lignins and NCGs. In some instances, the (c) recycling the heat transfer media from the calciner to the combustor further features producing combustion products. In some instances, the method provides for recovering carbon dioxide of 90%, 95%, 97%, or 99% or more purity and calcined lime mud.

The calcium carbonate lime mud may be obtained from a Kraft pulp and paper mill. In some instances, steam is provided to the bubbling fluid bed calciner as fluidization and diluent gas, and in some instances hot $CO_2$, and calcined lime mud are produced in the calciner and mixed with entering fluidization steam. In other instances, the hot $CO_2$, water vapor, and calcined lime mud exiting said calciner may be provided to a separator to separate coarse calcined lime mud and the hot $CO_2$/water vapor mixture and residual fine particle calcined lime mud may be provided to a spray or flash dryer. Likewise, in some instances the method further features quenching the hot $CO_2$, and water vapor mixture and residual fine particle calcined lime mud with cooled calcined lime mud product to a lower temperature in a second cyclone separator before directing the hot $CO_2$, and water vapor mixture and residual fine particle calcined lime mud to a flash dryer. Similarly, in some instances the method further features separating $CO_2$ in the exiting spray or flash dryer dust collector gases from the water vapor by condensing the water vapor by contact with water in a cooling tower. The hot process water created by water vapor condensation may be returned to, for instance, a manufacturing operation or facility such as a Kraft pulp and paper mill manufacturing operation. Also, in some instances, the bubbling fluidized bed calciner contains reheated media particles returning from the combustor. The method may also feature providing a makeup media for said moving media to the circulating fluid bed combustor.

In some instances, the method may further feature providing sorbent limestone to the circulating fluid bed combustor, to neutralize fuel derived $SO_2$ emissions. Similarly, the method may feature providing a fossil fuel, such as, for instance, coal, petroleum coke, waste coal and shredded tires to the combustor. The superheated high pressure steam may be generated by heat exchange with hot combustion products. Also, the method may feature preheating air entering the combustor and calciner fluidizing steam by heat exchange with hot combustion products. Still further, the method may feature recovering heat as hot process water or boiler feed water from the calcined lime mud. Even further, the method may feature mixing the wet lime mud feed with at least one of water, $H_2O_2$, $O_2$, $Na_2CO_3$, or $Na_2SO_4$. Also, the method may feature injecting dry lime mud into the fluidized media bed of the fluid bed calciner.

In some instances, the method includes removing ash or substantially all the ash from the heat transfer media, and this may be performed in a combustor freeboard section having an expanded diameter by decreasing velocity of the heat transfer media. The ash may be removed from the heat transfer media at a temperature of between 1550° F. and 1700° F., and the ash may be removed by introducing steam into a cone cap and slope stripper. The moving media may move between the calciner and the combustor at, for instance, 1530° F. to 1700° F., the combustor may operate at, for instance, 1550° F. to 1700° F., and the calciner may operate at 1400° F. to 1570° F., and the superheated high pressure steam generated may have a temperature of 750° F. to 1000° F. at a pressure of 615 psia to 1515 psia.

In a second aspect, the present invention provides a method for calcining calcium carbonate lime mud and converting it to carbon dioxide and calcined lime mud comprising:
(a) providing wet lime mud sufficiently near a bubbling fluid bed calciner and a spray dryer or flash dryer such that the calciner and flash dryer or spray dryer operate in counter/current gas/solids flow wherein exiting calciner gases substantially dry the wet lime mud and the resulting dry lime mud is fed to the calciner;
(b) feeding substantially dry lime mud to the fluid bed calciner wherein the fluid bed calciner is thermally linked by moving media heat transfer (MMHT) to a circulating fluid bed combustor by a heat transfer media wherein said media moves between said calciner and said combustor wherein MMHT provides heat input for calcination;
(c) removing substantially all ash from the heat transfer media;
(d) recycling the heat transfer media from said calciner to said combustor wherein said combustor receives one or more fuels and producing combustion products;
(e) recovering excess energy from the process of d) generating superheated high pressure steam;
(f) recovering carbon dioxide of 90% to +99% purity and calcined lime mud from the fluid bed calciner; and
(g) exporting the superheated high pressure steam to the Kraft pulp and paper mill.

In some instances, steam is provided to the bubbling fluid bed calciner as fluidization and diluent gas, and in some instances hot $CO_2$, and calcined lime mud are produced in the calciner and mixed with entering fluidization steam. In other instances, the hot $CO_2$, water vapor, and calcined lime mud exiting said calciner may be provided to a separator to separate coarse calcined lime mud and the hot $CO_2$/water vapor mixture and residual fine particle calcined lime mud may be provided to a spray or flash dryer. Likewise, in some instances the method further features quenching the hot $CO_2$, and water vapor mixture and residual fine particle calcined lime mud with cooled calcine product to a lower temperature in a second cyclone separator before directing the hot $CO_2$, and water vapor mixture and residual fine particle calcined lime mud to a flash dryer. Similarly, in some instances the method further features separating $CO_2$ in the exiting spray or flash dryer dust collector gases from the water vapor by condensing the water vapor by contact with water in a cooling tower. The hot process water created by water vapor condensation may be returned to a manufacturing process or operation, for instance, a Kraft pulp and paper mill manufacturing operation. Also, in some instances, the bubbling fluidized bed calciner contains reheated media particles returning from the combustor. The method may also feature providing a makeup media for said moving media to said circulating fluid bed combustor.

In some instances, the method may further feature providing sorbent limestone to the circulating fluid bed combustor, to neutralize fuel derived $SO_2$ emissions. Similarly, the method may feature providing a fossil fuel, such as, for instance, coal, petroleum coke, waste coal and shredded tires to the combustor. The superheated high pressure steam may be generated by heat exchange with hot combustion products. Also, the method may feature preheating air entering the combustor and calciner fluidizing steam by heat exchange with hot combustion products. Still further, the method may feature recovering heat as hot process water or boiler feed water from the calcine. Even further, the method may feature mixing the wet lime mud feed with at least one of water, $H_2O_2$, $O_2$, $Na_2CO_3$, or $Na_2SO_4$. Also, the method may feature injecting dry lime mud into the fluidized media bed of the fluid bed calciner.

In some instances, removing ash or substantially all the ash, from the heat transfer media may be performed in a combustor freeboard section having an expanded diameter by decreasing velocity of the heat transfer media. The ash may be removed from the heat transfer media at a temperature of between 1550° F. and 1700° F., by introducing steam into a cone cap and slope stripper. The moving media may move between the calciner and the combustor at, for instance, 1530° F. to 1700° F., the combustor may operate at, for instance, 1550° F. to 1700° F., the calciner may operate at 1400° F. to 1570° F., and the superheated high pressure steam generated may have a temperature of 750° F. to 1000° F. at a pressure of 615 psia to 1515 psia.

In a third aspect, the present invention features a process for producing carbon dioxide comprising:

(a) feeding lime mud obtained from a recausticizing operation to a bubbling fluid bed calciner thermally linked by moving media heat transfer (MMHT) using a solid particulate media to a second circulating fluid bed combustor wherein the MMHT provides heat input for calcining the lime mud;

(b) recycling the solid particulate media being from said calciner to said combustor; and (c) recovering carbon dioxide and calcined lime mud from the bubbling fluid bed calciner.

In some instances the carbon dioxide produced is at least 90%, at least 95%, at least 97%, at least 99% or more pure. In some embodiments, the process features further after step a) using calcination gases to dry wet lime mud from the recausticizing process in a spray dryer or flash dryer. In still further embodiments, the process features after step a) recovering excess enthalpy from the combustor process as super heated high pressure steam. The dry lime mud may be obtained from a spray or flash dryer, and the circulating fluid bed combustor may be provided WWTP sludge, biomass, precipitated lignins or NCGs as fuel. Steam may be provided to the fluid bed calciner as fluidization and diluent gas. The steam may also serve to increase the calcination reaction. Hot $CO_2$, steam, and calcined lime mud is normally produced from the fluid bed calciner and in most instances provided to a cyclone separator. A cyclone separator may separate coarse calcined lime mud and feed the hot $CO_2$, steam and residual fine particle calcined lime mud to a spray dryer or a flash dryer for said lime mud. In some instances, a spray dryer is used to produce high purity $CO_2$ and a flash dryer is used to produce a lower quality $CO_2$. In other embodiments, the method features quenching the hot $CO_2$, and steam mixture and residual fine particle calcined lime mud with cooled calcined lime mud to a lower temperature in a second cyclone separator before directing the $CO_2$, and steam mixture and residual fine particle calcined lime mud to a flash dryer.

In preferred embodiments, the process features additionally providing wet lime mud sufficiently near the fluid bed calciner and a spray dryer or flash dryer such that exiting gases from the calciner substantially dry the wet lime mud and the resulting relatively dry lime mud is fed to the calciner. The $CO_2$ in the exiting calciner gases may be separated from the combined fluidization steam and spray or flash dryer exiting water vapor by condensing this total water vapor amount with liquid water using direct contact in a cooling tower. In some embodiments, the hot liquid water created by water vapor condensation, and the quenching of exiting calciner $CO_2$ may be returned to the re-causticizing circuit.

In yet other embodiments, the method makes use of a calciner and a spray dryer or flash dryer operating in countercurrent gas/solids flow wherein wet lime mud is dried by exiting calciner gases and the resulting dry lime mud is fed to the calciner. In some embodiments, the fluid bed calciner is a bubbling fluidized bed calciner wherein the bed may comprise reheated solid particulate media returning from the circulating fluid bed combustor. In some embodiments, the method features feeding a makeup media for said moving media to said circulating fluid bed combustor. The makeup media may be alumina, silica, mullite or other solid, inert materials noted for strong thermal cycling and mechanical strength characteristics. In additional embodiments, the method features providing a sorbent limestone to said circulating fluid bed combustor. Such sorbent limestone may be useful to neutralize fuel derived $SO_2$. In yet other embodiments, the combustor may have a second fuel source including higher cost fossil fuels. Such fossil fuels may serve as backup fuels in the event of unavailability of adequate said primary fuels.

In some embodiments the method features generating superheated high pressure steam by heat exchange with hot combustion products. These features may allow export of said super heated high-pressure steam to a steam system of a mill. In addition, in some instances, the methods and systems may feature preheating combustion air for the circulating fluid bed combustor by heat exchange with hot combustion products. In addition, in some instances, the methods and systems may feature superheating saturated low pressure steam imported from the mill to provide the calciner process with internal steam requirements. Further, the methods and systems may include recovering enthalpy from the calcined lime mud using an indirect water cooled fluid bed device to generate hot boiler feed-water or hot process water.

Additionally, the method may include mixing the wet lime mud feed to the spray dryer or flash dryer with hydrogen peroxide ($H_2O_2$) or $O_2$, to convert $Na_2S$ contained in said lime mud into $Na_2SO_4$. Aqueous solutions of $Na_2CO_3$, or $Na_2SO_4$ may also be mixed to alter the $Na_2CO_3/Na_2SO_4$ ratio within the lime mud to a higher melting point. This may be particulary effective to mitigate calciner scaling and fouling and unwanted gaseous emissions. Still further, the method may include injecting the dry lime mud feed to the calciner at the base of the fluidized media bed of the calciner. This may help to maximize dry lime mud particle residence time thereby ensuring thorough calcination.

In a fourth aspect, the present invention provides a system for recovering carbon dioxide, for calcining calcium carbonate lime mud and converting it to carbon dioxide and calcined lime mud, or for calcining calcium carbonate lime mud and converting said calcium carbonate lime mud to $CO_2$ and calcined lime mud comprising a bubbling fluid bed calciner thermally linked by MMHT to a second circulating fluid bed combustor and wherein the MMHT provides heat input for calcining the lime mud. The system comprises a calciner and a combustor linked by a MMHT system or apparatus. The MMHT system or apparatus thermally links separate fluid bed combustion (exothermic) and calcination (endothermic) stages. In some embodiments, the system further comprises a spray dryer or a flash dryer.

In a fifth aspect, the present invention provides an integrated system comprising five interconnected, pyroprocessing and heat exchange unit operations, namely lime mud drying, bubbling fluid bed dry lime mud calcination, bubbling fluid bed calcined lime mud cooling, direct media heating within a circulating fluid bed combustor, and combustion products heat recovery and steam generation. The calciner and dryer operate in countercurrent gas/solids flow with wet lime mud being dried by exiting calciner gases and the resultant dry mud then being fed to the calciner. The present system provides MMHT to thermally link separate fluid bed combustion (exothermic) and calcination (endothermic) stages. A high temperature media, when separated from contaminates, is transported to a lower operating temperature bubbling fluid bed calciner where it surrenders stored enthalpy to satisfy the calciner and preceding lime mud dryer's endothermic heat needs. The cooled media exiting the calciner is then returned to a combustor for reheating.

DESCRIPTION OF PREFERRED EMBODIMENTS

Figure 1:
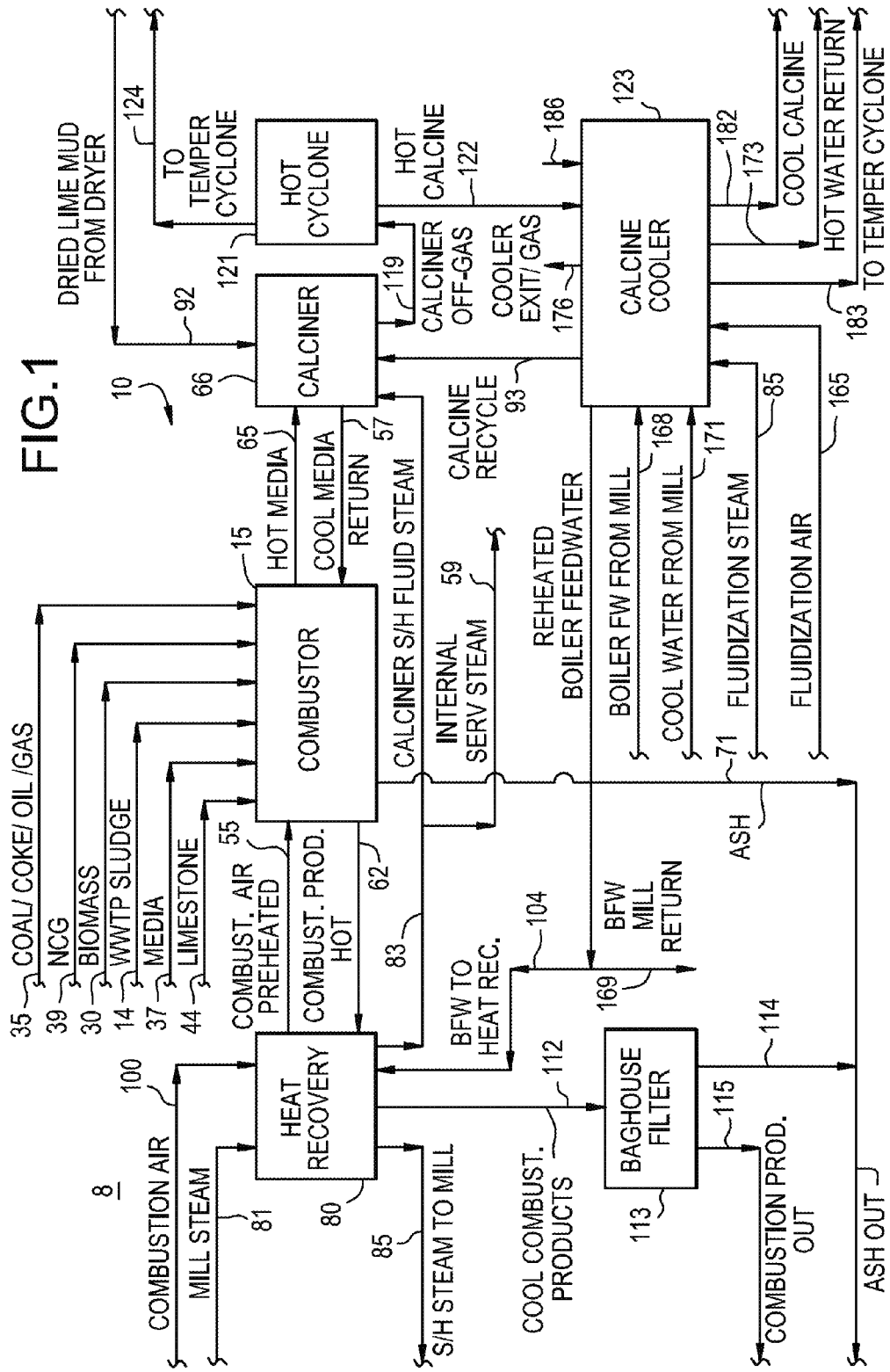
FIG. 1 provides a schematic block diagram of a preferred system of the invention.

Unless otherwise specified, as used herein, the following terms mean the following:

By "lime mud" is meant a water-wet lime mud produced as a fine precipitated $CaCO_3$ particle reaction product in a recausticizing manufacturing step where NaOH is made from the recausticizing reaction of CaO and $Na_2CO_3$.

By "waste water treatment (WWTP) sludge" is meant a primarily negative value water-wet sludge fuel as produced in a Kraft paper pulp mill's waste-water treatment plant (WWTP). This sludge contains organic, and inorganic, materials that may be rejected from various pulping and paper making steps. The energy content may be in the form of organic compounds, primarily cellulosic fiber and rejected lignins.

By "biomass" is meant a positive value fuel and may consist of bark, field trimmings, etc. derived from a mill's raw fiber feedstock (trees). The term also includes precipitated lignins.

By "non-condensable gases (NCGs)" is meant a noxious and explosive mix of mercaptans, hydrogen sulfide, methyl sulfides, turpentine, and methanol collected from various Kraft paper pulp mill processes, e.g. blow heat recovery systems, turpentine recovery, etc. NCGs may be combusted in a recovery boiler, or an incinerator/boiler, both to eliminate the nuisance and to recover enthalpy and valuable sulfur.

By "calcination" is meant a high temperature endothermic (heat is added to drive a chemical reaction) industrial thermal process to thermally dissociate inorganic carbonates (i.e., calcium and magnesium carbonates, a.k.a., limestones and dolomitic limestones) and hydroxides (i.e., aluminum and magnesium hydroxides) into the reactive, solid calcium, magnesium, or aluminum oxides and liberated gaseous reaction products, water vapor and/or $CO_2$. For example, lime mud may be first dried and then dissociated into $CO_2$ and CaO (a.k.a., calcined lime mud) with the latter being recycled to a preceeding recausticizing manufacturing operation. The gaseous, liberated $CO_2$, is that which originated with the $Na_2CO_3$.

By "calciner" is meant a chamber or apparatus for conducting a calcination reaction. A "calciner" may be fueled with oil, natural gas, or in some cases, coal or biomass, and, dependent on the feedstock's physical state. A "calciner" may be a shaft kiln, rotary kiln, flash calciner or fluid bed calciner as manufactured by Metso Mining or a multiple hearth furnace as manufactured by Hankin-Nichols.

By "bubbling fluid bed calciner" is meant a calciner that uses a solid particulate heat transfer media (e.g., silica, alumina, mullite, etc.) to calcine dried lime mud, all of which being suspended (i.e., fluidized) in an upward flowing stream of steam. The upward gas velocity may allow mixing all the solids with steam and evolved $CO_2$ "bubbles," but is usually not high enough to transport the media out of the bubbling bed but still allowing the calcined lime mud particle to be transported out of the bubbling media bed.

By "combustion" is meant an oxidative combustion (i.e., exothermic) reaction to release enthalpy contained in fuels (WWTP sludges, biomass, coal, coke, etc.) by mixing the fuels with excess air (the oxygen source). "Combustion" is a widely used high temperature industrial thermal process used to create recoverable enthalpy from the fuel combustion products ($CO_2$, nitrogen, oxygen, and water vapor). The extracted enthalpy may then be used for a final endothermic purpose, i.e., calcination, heating fluids, drying, generating steam, etc.

By "combustor" is meant a chamber or apparatus that conducts a combustion reaction under controlled conditions and permits the controlled extraction of the liberated enthalpy for useful process purposes. There are numerous industrial combustors available. The optimal choice is determined by fuel type and the desired end use of the enthalpy, i.e., steam generation, hot water production, gases (air, etc.) heating, process heat transfer fluid heating, or solid particulate moving heat transfer media heating.

By "moving media heat transfer (MMHT)" is meant a means or process for transferring the enthalpy generated by solid fuel combustion process in one vessel to an endothermic calcination reaction in another vessel. For example, typical calcination processes utilize in situ (in the same vessel as calcination) combustion. Many of these calcination processes use ash-free, higher cost liquid and gaseous fuels (oil, natural gas) since ashes contained in much lower cost solids fuels would contaminate the calcined lime mud. MMHT allows low cost fuel use while avoiding calcined lime mud contamination with ash. By using MMHT, a calciner's endothermic reaction enthalpy may be transported to the calciner by a fluidizable solid particulate media that freely circulates between a combustor and a calciner. Many low cost solid fuels are effectively combusted in a circulating fluid bed combustor, and many calcination reactions effectively occur in bubbling fluidized bed reactors. Thereby, MMHT provides for extracting released enthalpy in a combustor and then transferring that same enthalpy into a calciner. In exemplary MMHT systems, the solid particulate heat transfer media has a larger size particle than the entering dried lime mud such that the dried lime mud passes through the bubbling fluidized media bed and is fully calcined, without cross-contamination. The calciner's operating temperature is lower than the combustor's such that the contained media's enthalpy can be rapidly transferred into the calciner and then re-heated in the higher temperature combustor. In other exemplary systems, MMHT facilitates steam fluidization of the calciner which permits lowering the calcination temperature thereby creating an effective temperature differential between the combustor and calciner which further reduces the particulate heat transfer media's mass circulation rate. Lastly, MMHT facilitates calcination atmosphere control by allowing flexible $CO_2$/steam ratio partial pressure adjustment and temperature adjustment by separating the combustor's gaseous combustion products from the calciner's $CO_2$/steam gaseous atmosphere.

By "circulating fluid bed combustor" is meant a combustor design featuring a circulating fluid bed combustor comprised of two fluidized media sections. A lower bubbling fluid bed section contains large particle heat transfer media fluidized by incoming fluidization air. Fine particle media returning from the calciner and fuel may be injected into this large media bed. The air velocity is normally insufficient to transport large media particles out of this bed, but sufficient to vertically transport fine particle media and fuel ash media out of it into a second section, known as the transport column. Fine media within this latter section absorbs much of the released fuel enthalpy. Some of the fine media contacting the transport section's wall may circulate back to the lower bed. This design approach is very similar to that used for circulating fluid bed boilers as manufactured by Foster Wheeler or Alstom.

By "spray dryer" is meant a convective dryer that may be fed with, for example, pumpable slurries, pastes, or solutions that may be atomized into a fine, spherical droplet "cloud" by a mechanical atomizer, such as a high speed rotating disc or pressure nozzle. The cloud may be contacted with a hot gas stream capable of evaporating moisture from the pumpable feed. Exemplary spray dryers include those manufactured by GEA Niro.

By "flash dryer" is meant a convective dryer that may be fed with filter cakes, sludges, or fibrous materials. The feed may be introduced proximate to a drying gas introduction point such that dried solids and spent drying gases may move in a co-current fashion in a vertical transport column. Such a co-current flow profile may limit the inlet gas temperature dependent on the heat sensitivity of the feed material. Flash dryers include those manufactured by Alstom.

The present methods and systems produce commercial quality $CO_2$ of 90% to +99% purity. The commercial quality $CO_2$ may be produced using, for instance, Kraft paper pulp mill lime mud as the sole feed material. High reactivity "soft-burned" calcined lime mud product required in the pulp mill's recausticizing circuit is also produced in an energy efficient manner by utilizing readily available low quality and low cost fuels.

The present methods and systems utilize two particularly key technologies, namely (1) MMHT and (2) steam calcination. The methods of the present invention rely on MMHT to thermally link separate fluid bed combustion (exothermic) and calcination (endothermic) stages. This allows using low cost mill waste and biomass fuels without contaminating calcined lime mud with fuel ash. The methods of the present invention result in high quality $CO_2$ recovery by not commingling ash or combustion products with fluidization steam and $CO_2$ evolved during the calcination reaction. The methods also provide high quality calcined lime mud since there is no commingling of ash with the calcined lime mud created by the calcination reaction.

By using MMHT, unlike the rotary kiln/LMD process, required enthalpy for lime mud calcination and drying is not generated in situ within the calciner. Instead, a separate circulating fluid bed combustor burns negative value mill (WWTP) sludge and noxious NCGs with readily available, higher quality biomass (bark, tree trimmings, sawdust, etc.) fuel to heat circulating inert, solid particulate media. This high temperature media, when separated from ash contaminates, is then transported to the lower operating temperature bubbling fluid bed calciner where it surrenders its stored enthalpy to satisfy the calciner and preceding lime mud dryer's endothermic enthalpy needs. The cooled solid particulate media exiting the calciner is then returned to the combustor for reheating.

WWTP sludge is not used in a rotary kiln/LMD lime mud calciner given its high ash and moisture content. While ash contamination alone is a major impediment, WWTP sludge's high moisture content precludes creation of the high adiabatic flame temperatures required in a rotary kiln for effective heat transfer and flame stability.

A strong enthalpy balance relationship exists, however, which, when combined with fluid bed combustion and MMHT, justifies using WWTP sludge in a calcination process provided there is a significant operating temperature differential between the combuster and calciner media beds. A typical bleached Kraft paper pulp mill requires 320 mtpd of calcined lime mud/1000 adtpd paper pulp. Additionally, a typical mill produces approximately 100 mtpd dry basis WWTP sludge per 1000 adtpd paper pulp. Therefore, the dry basis WWTP sludge to calcined lime mud mass ratio, on an equivalent basis, is 0.313 dry mtpd WWTP sludge/mtpd calcined lime mud.

A typical modern rotary kiln/LMD) has a high heat value (HHV) fuel oil consumption of 1.4 million Kcal/metric ton calcined lime mud. Wet (58% water) WWTP sludge has an HHV of 2159 Kcal/kg. Therefore, given the 0.313 dry mtpd WWTP sludge/mtpd calcined lime mud mass ratio, the total enthalpy available in wet WWTP sludge per ton of calcined lime mud is 1.61 million Kcal, or a significant portion of the required net calciner enthalpy load even when considering that enthalpy value lost to evaporating WWTP sludge associated water.

The most common application of MMHT is in a petroleum refinery's fluid catalytic cracking operation where a liquid semi-refined feedstock is thermally "cracked" into gasoline feedstock in a fluid bed reactor utilizing a hot re-circulating solid catalyst to transfer enthalpy to drive the endothermic cracking reaction.

The methods described herein also use steam to control calciner $CO_2$ partial pressure while also allowing the calcination reaction to proceed more rapidly than that found with air based calcination while also providing an easy means to subsequently separate commercial quality $CO_2$ from the steam using accepted steam condensation techniques. Lowering the calcination temperature facilitates MMHT use by creating a satisfactory temperature differential between the hot media and the calcination temperature thereby permitting rapid heat transfer to occur at reduced media circulation rates between combustor and calciner. Lowering the calcination temperature also inhibits calcined lime mud agglomeration and calciner surface scaling caused by low melting point mixtures of $Na_2CO_3$ and $Na_2SO_4$. Conversely, MMHT facilitates the flexible adjustment of steam/$CO_2$ mixtures and temperatures in the calciner by not allowing gaseous combustion products to mix with the calcination atmosphere.

The favorable effect of steam on calcium carbonate's calcination reaction rate was first noted by Berger ("Effect of Steam on the Decomposition of Limestone", *Industrial and Engineering Chemistry*, vol. 19, no. 5, May 1927). Senum (Steam Catalysis of Limestone Calcination, Brookhaven National Laboratory, Contract EY-76-C-02-0016 for US ERDA, 1976) provided a good overview of early, significant research with the most relevant references to the present invention being Bischoff ("Kinetics of Thermal Dissociation of Dolomite and Limestone in Various Gas Flows", *Zeitschrift für Anorganische Chemie.*, vol. 262, 1950) and MacIntire/Stansel ("Steam Catalysis in Calcination of Dolomite and Limestone Fines", *Industrial and Engineering Chemistry*, vol. 45, no. 7, July 1953). Subsequently, Burnham/Stubblefield/Campbell ("Effects of Gas Environment on Mineral Reactions in Colorado Oil Shale", Fuel, vol. 59, December 1980), Weisweiler/Hoffman ("Effect of Water Vapour on the Calcination of Limestone in a Fluidized Bed Reactor", Zement-Kalk-Gips (36, Jahrgang), nr. 10, 1983), Khraisha/Dugwell ("Effect of Water Vapour on the Calcination of Limestone and Raw Meal in a Suspension Reactor", *Transactions of the Institute of Chemical Engineers*, vol. 69, part A, January 1991), and Wang/Thompson ("The Effects of Steam and Carbon Dioxide on Calcite Decomposition using Dynamic X-Ray Diffraction", *Chemical Engineering Science*, vol. 50, no. 9, 1995) provided greater insight.

More recently, and due to the high interest in capturing $CO_2$ from coal fired power plants to remediate global warming, there has been an increase in the knowledge base regarding limestone calcination in steam atmospheres with the most relevant references to the present invention being Wang et. al. ("Limestone Calcination with $CO_2$ Capture (II): Decomposition in $CO_2$/Steam and $CO_2$/$N_2$ Atmospheres", *Energy and Fuels*, vol. 22, no. 4, 2008), Wang et. al. ("Experimental Study on $CO_2$ capture Conditions of a Fluidized Bed Limestone Decomposition Reactor", *Fuel Processing Technology*, vol. 91, pages 958-963, 2010) and Feng et. al. ("Modeling of $CaCO_3$ Decomposition under $CO_2$/$H_2O$ Atmospheres in Calcium Looping Processes", *Fuel Processing Technology*, vol. 125, pages 125-138, 2014).

A consensus of these research results is that using a 100% steam atmosphere or steam/air atmospheres of certain ratios result in three (3) key impacts during limestone ($CaCO_3$) calcination; (1), a lowering of the equilibrium dissociation temperature at the same $CO_2$ partial pressure relative to that in 100% air or $N_2$ and (2), a limited catalytic effect, primarily at lower calcination temperatures with an increase in the calcination reaction rate and (3), any positive reaction rate effect diminishes after a maximum steam concentration is attained.

In the present invention, hot media is introduced into the calciner along with dry lime mud. Also sufficient fluidizing steam to catalyze the calcination reaction, and control calciner temperature and $CO_2$ partial pressure is injected. All these components are thoroughly mixed in the back-mixed, bubbling fluid bed calciner. Reaction products consisting of calcined lime mud particles and the gaseous steam/$CO_2$ mixture exiting the fluid bed calciner are cyclone separated before the largely cleaned, hot, steam/$CO_2$ mixture reports to the lime mud dryer. Reduced temperature media is gravity discharged from the fluid bed calciner and returned to the combustor to renew the heating cycle.

To inhibit calcine agglomeration and calciner surface scaling due to the presence of low melting point mixtures of $Na_2CO_3$ and $Na_2SO_4$, a portion of the hot calcined lime mud product is recycled to the calciner to create more nucleation sites, thereby reducing the potential for calcined lime mud particle agglomeration and calciner surface scaling. To also minimize introduction of low melting point $Na_2CO_3$/$Na_2SO_4$ mixtures, prior to the calciner, $H_2O_2$ is added to wet lime mud (prior to feeding same to the flash or spray dryer) to convert residual $Na_2S$ to $Na_2SO_4$. This creates a higher melting point $Na_2CO_3$/$Na_2SO_4$ mixture. Small amounts of $Na_2SO_4$ or $Na_2CO_3$ solutions may be added at the same point to have the same result.

The calcination and lime mud drying steps in the present invention are process decoupled from the combustion step. This feature of the present invention provides the opportunity for substantial process control within the calciner since the calcination atmosphere can be carefully modeled without the influence of fuel combustion products. The exit temperature and humidity of the lime mud dryer may also be optimized for maximum energy efficiency by balancing its enthalpy needs with the calciner atmosphere's exiting steam/$CO_2$ mixture temperature and volume.

The calcination temperature can be varied between 760° C. (1400° F.) and 854° C. (1570° F.) by altering the media circulation rate between the calciner and the combustor. Considering this separation of unit operations, the $CO_2$ partial pressure exiting the calciner can also be varied between 25% and 90%, but typically 85%, of the dissociation equilibrium $CO_2$ partial pressure for calcination within a given steam/$CO_2$ atmosphere.

Within certain combinations of calcination reaction $CO_2$ partial pressure and temperatures, the calcination reaction rate may be significantly depressed. To ensure complete calcination, the dry lime mud may be injected into the base of the calciner, beneath the bubbling media bed, yielding a "hindering effect" of the larger media particle bubbling bed on an upward flowing smaller lime mud particle thereby providing enhanced residence time. The dense media bed acts as a physical barrier to prevent un-calcined lime mud particles from exiting the calciner too quickly. See, Talukdar/Mathur, ("Residence Time Studies of Fine Particles Circulating through a Fluidized Bed of Coarse Solids". Department of Engineering, University of New Hampshire. Presented at AIChE 1995 Annual Meeting).

The total enthalpy of exiting calcination gases may be sufficient to efficiently dry the incoming lime mud in a spray dryer at an inlet gas temperature not less than 760° C. (1400° F.) and not exceeding 982° C. (1800° F.) while maintaining a spray dryer exit gas temperature at no less than 88° C. (190° F.) and no greater than 104° C. (220° F.) depending upon the entering total lime mud solids content, but with the need to maintain a dried particle moisture content at no greater than 2% by weight.

Further, the total enthalpy of exiting calcination gases may also be sufficient to efficiently dry the incoming lime mud in a flash dryer at an inlet gas temperature not exceeding 593° C. (1100° F.) while maintaining a flash dryer exit gas temperature at no less than 91° C. (195° F.) and no greater than 104° C. (220° F.) dependent upon the entering total lime mud solids content, but with the need to maintain a dried particle moisture content at no greater than 2% by weight. This drying gas inlet temperature control is necessary to prevent lime mud agglomeration in the flash dryer, and/or mechanical damage to the flash dryer and is accomplished by quenching calciner hot exit gases with re-cycled, cool calcined lime mud from the calcined lime mud cooler and returning re-heated calcined lime mud to the cooler.

Fuel ash and combustion products are not mixed with solid and gaseous reaction products in the present methods and systems and unlike the rotary kiln/LMD processes, high cost liquid/gaseous fossil fuels are not used. Decoupling also permits the relatively clean hot, gaseous combustion products to transfer enthalpy into combustion air preheating and steam generation using conventional heat exchanger designs without the unwanted heat transfer fouling influence of the $Na_2CO_3$/$Na_2SO_4$ low melting point mixtures potentially found in the calcination stage.

MMHT allows cost effective equipment design. The large exhaust gas volume from the rotary kiln/LMD lime mud calciner largely derives from fuel combustion products and not the commingled $CO_2$ reaction product. Decoupling fuel combustion from the fluid bed calciner reduces calciner exit gas volume thereby significantly increasing the calcined lime mud production rate per unit fluid bed area at the same superficial fluidization velocity. Further, the separated circulating fluid bed combustor is free to operate at a much higher fluidization velocity than the separated bubbling fluid bed calciner. Accordingly, the present methods and systems allow a compact fluid bed calciner with calcined lime mud product throughputs equivalent to and perhaps greater than the largest rotary kiln/LMD systems but without the land usage penalty.

Hydrocarbon cracking and pyrolysis processes typically use MMHT to transfer enthalpy from a solid to a gaseous stream whereas the present methods and systems are designed to transfer enthalpy from one fluidized solid to another. The media used for MMHT is selected for its thermal stability and resistance to mechanical decrepitation. Inert materials such as alumina, silica, and mullite are several examples. The selected media's size distribution and specific gravity is such as to allow vertical transport (with fine fuel ashes) at superficial gas velocities between 3.1 and 6.1 meters/sec (10 to 20 feet/second) in the combustor while also developing a bubbling, dense fluid bed in the calciner at superficial gas velocities less than 1.5 meters/second (5 feet/second). The small, dried lime mud particles have a transport velocity well under 1.5 m/s, allowing them to transit through the bubbling media bed, absorbing enthalpy from the media, and undergoing calcination before exiting with the steam/$CO_2$ gas mixture.

MMHT combined with the associated separation of the combustion and calcination processes allows using 100% steam as a calciner atmosphere diluent and fluidizing gas instead of non-condensable fuel combustion products or just air. Variable steam dilution controls $CO_2$ partial pressure that impacts calcination reaction rate. Steam also catalyses the calcination reaction such that it proceeds at a lower temperature than if the fluidization gas was only air at the same $CO_2$ partial pressure. The total volumetric amount of steam also controls $CO_2$ partial pressure such that the calcination reaction rate can occur at an acceptable level while resulting in a steam/$CO_2$ mixture that provides sufficient enthalpy in the exiting calciner gases to efficiently dry incoming wet lime mud fed to the spray or flash dryer. Importantly, using steam permits subsequent economic separation and recovery of commercial quality non-condensable $CO_2$ from steam using well accepted condensation technologies.

The present invention provides an integrated process system comprising five (5) separate, but interconnected, pyro-processing and heat exchange unit operations; (1) lime mud drying, (2) bubbling fluid bed dry lime mud calcination, (3) bubbling fluid bed calcined lime mud cooling, (4) direct media heating within a circulating fluid bed combustor, and (5) combustion products heat recovery and steam generation. For energy economy reasons, the calciner and dryer operate in countercurrent gas/solids flow with wet lime mud being dried by exiting calciner gases and the resultant dry mud then being fed to the calciner.

Figure 2:
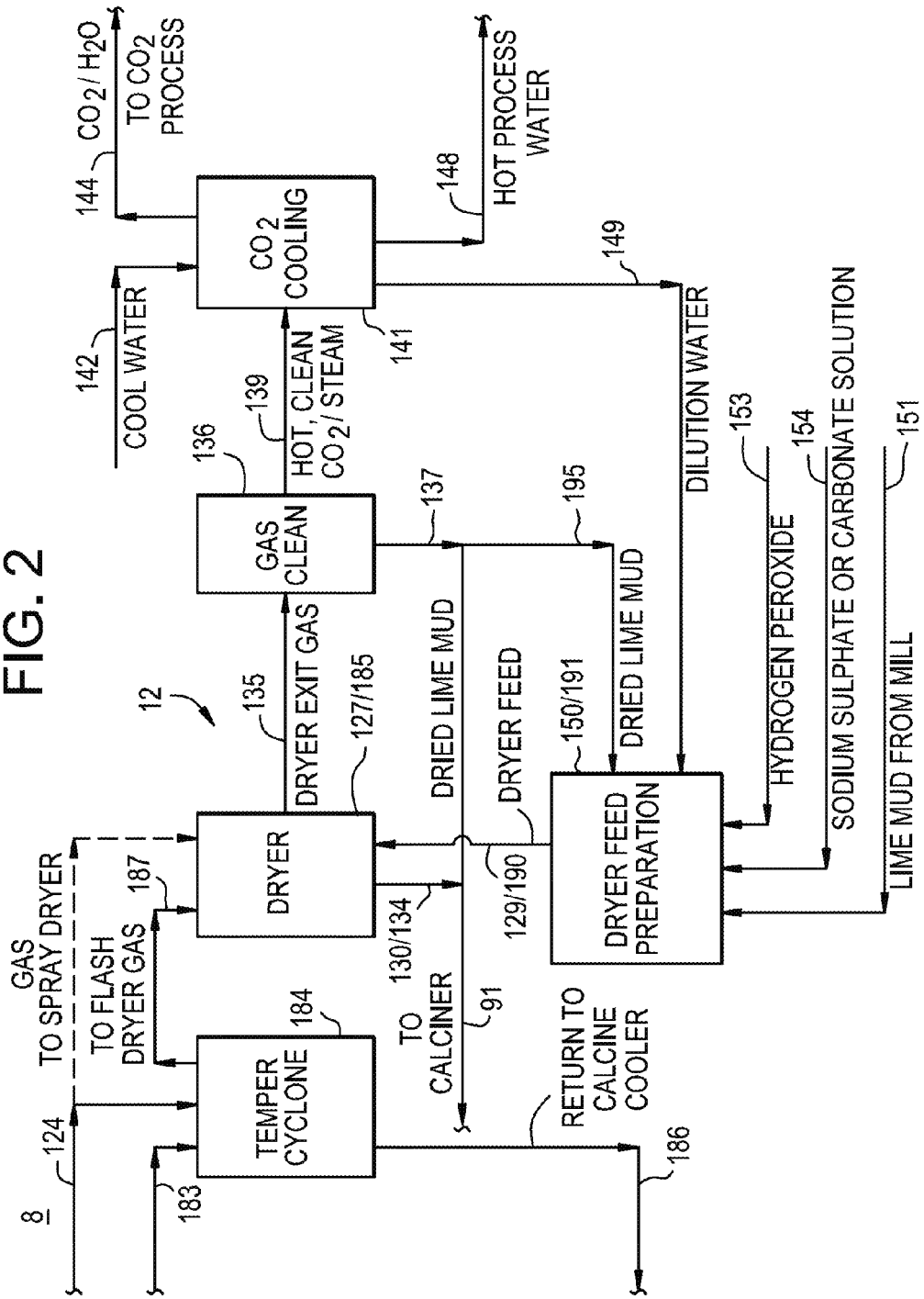
FIG. 2 provides a schematic block diagram of a preferred system of the invention.
Figure 3:
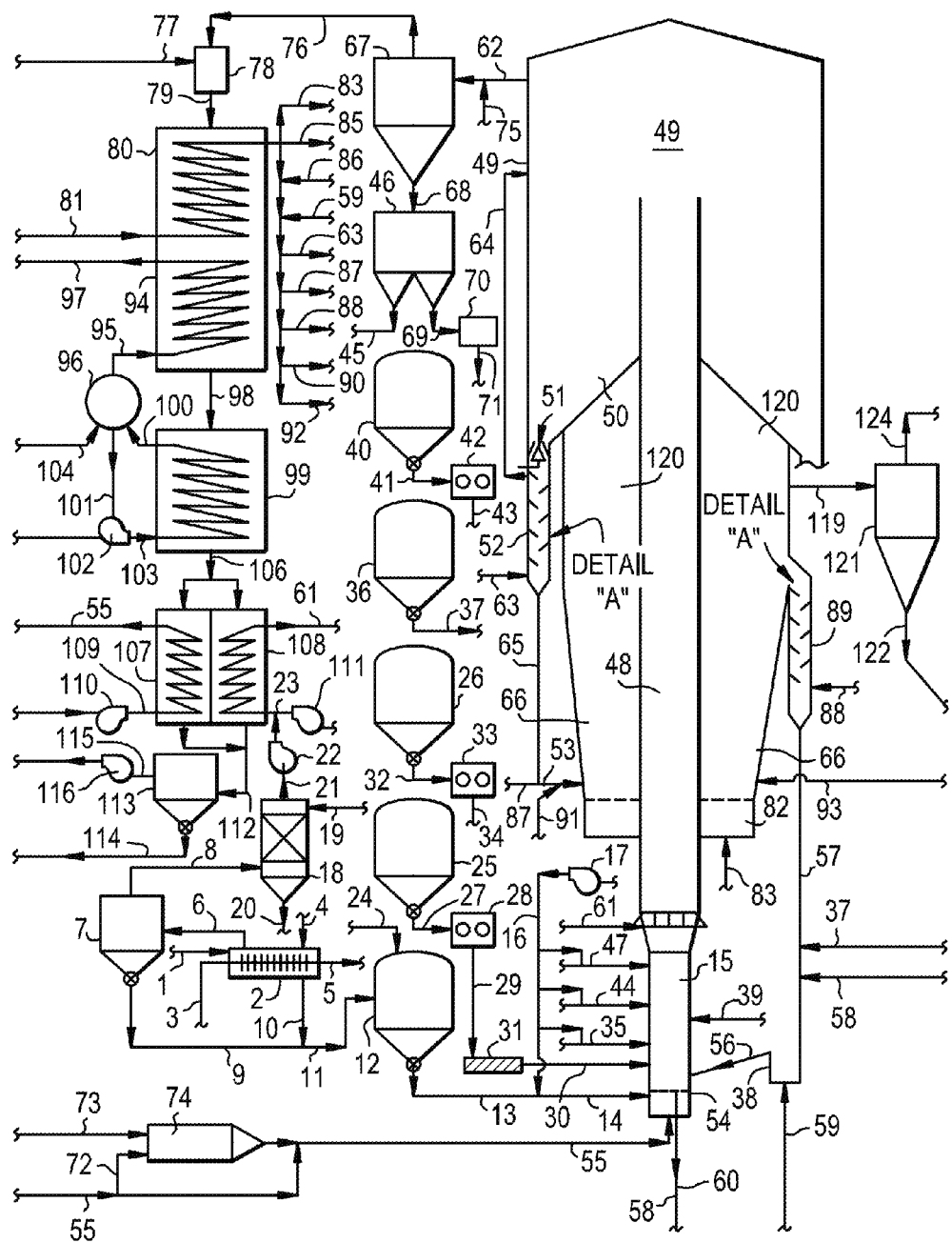
FIG. 3 depicts a further schematic block diagram providing more detail for the system of the present invention.
Figure 4:
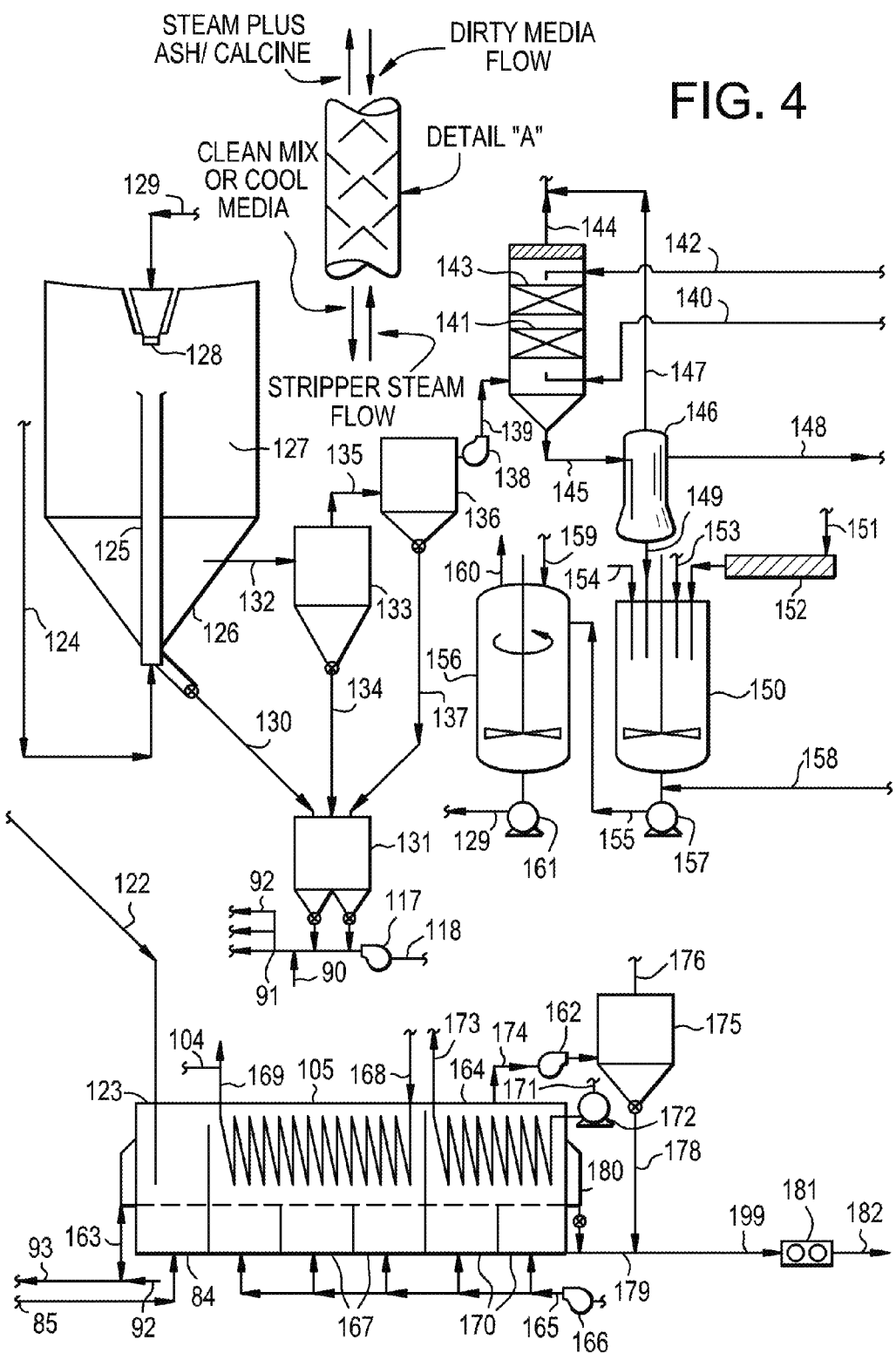
FIG. 4 depicts a further schematic block diagram providing additional detail for the system of the present invention.
Figure 5:
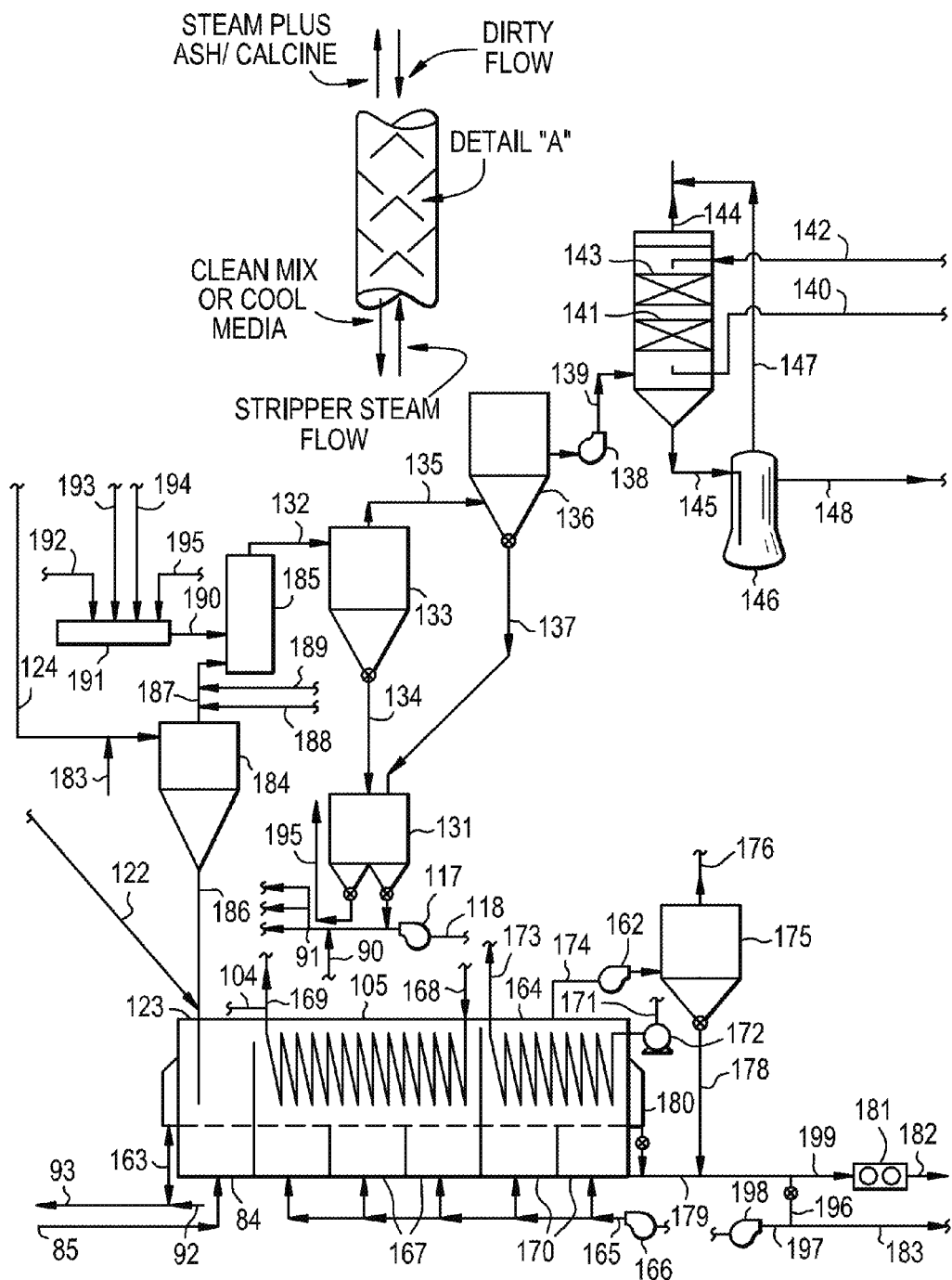
FIG. 5 depicts a further schematic block diagram providing additional detail for the system of the present invention.

FIGS. 1 and 2 schematically illustrate a system 8 which may be used to practice the present invention. FIGS. 3, 4, and 5 represent a considerably more detailed showing of the system 8. FIG. 1 shows the combustion, heat recovery, calcination and product cooling section 10 of system 8. FIG. 2 shows the dryer and $CO_2$ preparation section 12 of system 8.

FIG. 2 depicts lime mud 151 from the mill (not shown) provided to dryer feed preparation means 150 along with hydrogen peroxide 153, and sodium sulphate or carbonate solution 154 and re-cycled dried lime mud, 195 when a flash dryer 185 is used or hot dilution water 149 when a spray dryer 127 is used. Prepared dryer feed then proceeds to the spray dryer 127 via 129 and to the flash dryer 185 by 190. The flash dryer 185 receives hot gas 187 from temper cyclone 184 and the spray dryer 127 receives hot gas 124 directly from calcined lime mud cyclone 121 (FIG. 1). Dry lime mud 91 collected from the gas cleaner 136 proceeds to calciner 66 (FIG. 1). Dryer exit gas 135 from either flash dryer or spray dryer is cleaned by gas cleaner 136, and the output gases 139 consisting of hot, clean $CO_2$ and steam are passed to $CO_2$ cooling means 141. The $CO_2$ and steam gases are direct water 142 quenched and saturated hot water from the cooling means 141 is passed back through line 149 for use as hot dilution water when a spray dryer 127 is used, or for return to the mill 148 when either a spray 127 or flash dryer 185 is used. Cooled, water-saturated $CO_2$ proceeds 144 to a $CO_2$ gas processing unit beyond the battery limits of this invention.

FIG. 1 depicts a combustor 15 fired at 35 with backup coal, petroleum coke, shredded tires, waste coal, oil and or gas, but uses as its primary fuels, WWTP sludge and/or precipitated lignins 14 and/or biomass (bark, sawdust, etc.) 30 and NCG 39 and limestone at 44 to react with excess $SO_2$. Make up media 37 for the MMHT is added as needed. The hot media 65 passes to calciner 15 and after transferring its enthalpy content is returned as cool media 57 to combustor 15 for further heating and recycling. Spent combustion products and ash exit combustor 15 via 62 and report to the heat recovery means 80.

Hot combustion products 62 exiting fluid bed combustor 15 enter the heat recovery means 80 which is provided with saturated steam from the Kraft paper pulp mill at 81, re-heated boiler feed-water at 104, and ambient combustion air at 100. Recovered heat is created in the form of super-heated high pressure steam 85 exported to the mill, pre-heated combustion air 55, pre-heated calcination fluidization steam 83, and internal service steam 59, all leaving the heat recovery means 80.

Calciner 66 receives super-heated fluidization steam 83 from heat recovery means 80. The calciner off-gas 119 consisting of hot $CO_2$, steam and calcined lime mud products, proceeds to hot cyclone separator 121. Hot calcined lime mud 122 passes to calcined lime mud cooler 123 and some residual un-calcined lime mud and calcined lime mud is recycled at 93 to calciner 66. Steam, $CO_2$ and some residual calcined lime mud 124 from the hot cyclone 121 pass directly to a spray dryer 127 but may be first passed to temper cyclone 184 (FIG. 2) when a flash dryer 185 is used.

Fluid bed calcined lime mud cooler 123 is seen to have as indirect cooling inputs boiler feed water 168 from the mill, cool water 171 from the mill, fluidization steam 85 and fluidization air 165. Its outputs include reheated boiler feed water 104 which is fed to heat recovery means 80 and also in part returned 169 to the mill; a hot water return at 173, cooled calcined lime mud product at 182 to the mill; and cooled calcined lime mud recycle at 183 to the temper cyclone 184 when a flash dryer 185 is used. Reheated calcined lime mud 186 leaving the temper cyclone 124 and hot calcined lime mud 122 from hot cyclone 121 are both returned to the fluid bed calcined lime mud cooler 123. Cleaned, fluid bed calcined lime mud cooler exhaust gases at 176 are sent to atmosphere. Cooled combustion products 112 from heat recovery means 80 are sent to a bag house filter 113 at which dry ash 114 is separated from combustion products 112 and added to dry ash 71 from combustor 15 and are then subsequently disposed. Cleaned, cool combustion products at 115 are sent to atmosphere.

A more detailed diagram is provided in FIGS. 3, 4, and 5 which are not to scale and the process stream numerical designations may not necessarily follow in the same sequence as the following description. Stream numbers are denoted by "[ ]" and process equipment items by "( )". The process depicted in FIGS. 3, 4, and 5 may be divided into eight (8) process "islands" as follows: (1) Combustor Fuel Preparation and Solids Handling; (2) Fuel Combustion and Media Heating; (3) Fuel Combustion Products Heat Recovery and Steam Generation; (4) Steam Calcination of Dried Lime Mud; (5) Lime Mud Drying; (6) Carbon Dioxide Recovery; (7) Lime Mud Preparation; and (8) Calcined Lime Mud Cooling and Pelletizing.

Combustor Fuel Preparation and Solids Handling

The primary fuel, wet WWTP sludge, is delivered [1] to an indirectly steam heated dryer (2) which utilizes low-pressure, saturated steam [3] provided by the mill. Sweep air stream (4) acts to carry the evaporated water and prevent condensation. Condensed steam (5) is returned to the mill. The dryer exit gas [6] reports to the fabric filter (7) where it is separated into clean gas air/water mixture [8] and captured dryer carryover solids [9].

Dried WWTP sludge, [10] is mixed with dryer carryover solids [9] and jointly fed [11] to silo (12). The combined streams [13] are pneumatically injected [14] into fluid bed combustor lower section, (15) via pressurized air [16] provided by blower (17).

Clean dryer exit gas [8] reports to a direct contact water cooler (18) using mill process water [19] as the coolant. Condensed hot water [20] is returned to the mill's process hot water system. Cooled, saturated exhaust air [21] is pressurized and delivered via blower (22) to the fluid bed combustor's secondary combustion air inlet stream, [23].

Under normal operating conditions, there is a close balance between WWTP sludge supply and combined calciner and dryer enthalpy load. Should there be a enthalpy supply shortage, dried, precipitated lignins from the mill's recovery boiler area can be added directly [24] to silo (12) and jointly injected [14] with dried WWTP sludge into fluid bed combustor lower section [15] via pressurized air [16] provided by blower (17).

Should the mill not have available precipitated lignins, fuel silos, (25) and (26) provide increasingly higher cost fuels. Silo (25) stores wet biomass, the preferred secondary fuel due to its low cost and availability in Kraft paper pulp mills. The biomass is delivered via [27] to a chipper/shredder (28) after which it [29] is mechanically conveyed (30) to the fluid bed combustor lower section (15) via screw feeder (31) or other appropriate feeding device.

A silo (26) stores costlier fossil fuels such as high sulfur coal, petroleum coke, shredded tires, waste coal, etc. should biomass be unavailable in sufficient quantities to satisfy the system's total enthalpy requirements. They are delivered [32] to a pulverizer (33) pulverized into a fine powder [34] and then pneumatically conveyed [35] into the lower fluid bed combustor section (15) using transport air [16] provided by blower (17). The fuel is pulverized by (33) to ensure rapid combustion and complete ash separation from hot heat transfer media.

The silo (36) contains makeup media to replace that destroyed by cyclic handling when utilizing MMHT. The media can be alumina, silica, mullite or other solid, inert materials noted for strong thermal cycling and mechanical strength characteristics. It is gravity delivered via [37] to the cooled media return "J" valve, (38).

Other fuels injected into the fluid bed combustor lower section (15) are all collected Kraft paper pulp mill NCGs and fuel oil or natural gas, [39]. The NCGs provide a noticeable enthalpy input and can be safely disposed of in an environmentally sound manner during normal NCG incinerator downtime periods. Oil and natural gas are used for rapid temperature trimming, and startup.

To neutralize emitted $SO_2$ from solid fuel, NCG, and fuel oil combustion, sorbent limestone is added to the fluid bed combustor lower section (15) at a Ca/S molar ratio between 1.0 and 2.5. This technique is well known to those familiar with fluid bed combustor design. Market quality limestone is stored in silo (40) and conveyed [41] to pulverizer (42) and converted into finely ground limestone [43] prior to pneumatic injection [44] into the lower fluid bed combustor lower section (15) using transport air [16] provided by blower (17). The limestone is pulverized so as to ensure rapid $SO_2$ sorption and subsequent complete separation from hot heat transfer media.

Lastly, separated combustor ash [45] from storage silo (46) is pneumatically conveyed [47] into the fluid bed combustor lower section, (15) by transport air [16] provided by blower (17). This ash may be recycled to ensure complete fuel carbon content combustion. This technique is well known to those familiar with fluid bed combustor design.

Fuel Combustion and Media Heating

WWTP sludge and precipitated lignins [14], other fuels [30, 35, and 39], ash [47] and limestone [44] are injected into the fluid bed combustor lower section (15) of a refractory-lined circulating fluid bed combustor which may be comprised of eight sections, (15), (48), (49), (50), (51), (52) (53) and (54).

Pressurized combustion air, between 1.14 and 1.36 bar (16.5 to 19.7 psia) and pre-heated to between 149° C. and 204° C. (300° F. to 400° F.) is introduced via stream [55] into the cylindrical or rectangular combustor fluidizing air plenum, (54). The amount of air introduced is less than the stoichiometric amount required for full combustion of all fuels entering cylindrical or rectangular combustor section [15] so as to ensure reducing conditions within this combustor section. A gas distribution grid (nozzle or orifice plate) mechanically separates combustor sections [15] and [54]. All these techniques are well known to those familiar with fluid bed combustor design.

Fluid bed combustor lower section (15) is a dense bubbling bed made primarily large media particles. These large media particles are sized to not elutriate when the cross-sectional gas combustion product gas velocity within fluid bed combustor lower section (15) is 6.1 meters per second (20 feet per second) or greater. Introduced fuels are gasified and partially combusted in this sub-stoichiometric combustion section, their released enthalpy being absorbed by 788° C. to 882° C. (1450° F. to 1620° F.) cooled media [56] comprised of that returned from the calciner via stream [57], combustor bed return via stream [58], and makeup media via stream [37].

Returned cool media [56] enters fluid bed combustor lower section [15] via a "J" valve (38, a.k.a. loop-seal) fluidized with super-heated steam [59] at 2.07 bar (30 psia) and 204° C. (400° F.).

As large clinkered ash particles increase in volume in fluid bed combustor lower section (15), they, and some media are gravity discharged via a high-temperature "cone" valve (60) and are externally separated with large media [58] being returned to fluid bed combustor lower section (15) via cooled media stream [56]. Such valve designs are well known to those familiar with fluid bed combustor and calciner design techniques.

Pressurized secondary combustion air [61], between 1.15 and 1.22 bar (16.7 to 17.7 psia) and pre-heated to between 149° C. and 204° C. (300° F. to 400° F.) is provided to complete fuel burnout and circulating media heating in cylindrical or rectangular combustor section (48).

This secondary combustion air introduction technique is widely used with circulating fluid bed boilers. Total excess oxygen exiting fluid bed combustor transport section (48) is between 10% and 35% above that required for stoichiometric combustion and is dependent on a given combined fuel mix's combustion characteristics. The combustor equilibrium temperature for ash, media, and gas will be between 843° C. and 927° C. (1550° F. and 1700° F.).

Due to the high superficial gas velocity of combustion products in fluid bed combustor transport section (48), ash particles and circulating media are vertically transported together into cylindrical combustor freeboard section (49) in excess of the media's transport velocity. This velocity normally does not exceed 6.1 mps (20 fps).

Combustor freeboard section (49) is a cylindrical expanded diameter upper chamber that acts to disengage reheated circulating media at between 843° C. and 927° C. (1550° F. and 1700° F.) from ash. Its cross-sectional area is such that the gaseous combustion products exiting fluid bed combustor transport section (48) are rapidly expanded to a lower velocity. This lower gas velocity is less than the circulating media particles' vertical transport velocity of 6.1 mps (20 fps) but much greater than the fine ash particles' vertical transport velocity.

In this manner, entrained ash exits combustor freeboard section (49) via stream [62] with fuel combustion products while reheated, largely ash-free media drops by gravity into a combustor storage section (50) that is an integral hot media storage hopper. The volume of combustor storage section (50) is such that it can store hot media when the calcination step requires only 25% of the combustor's full enthalpy release capacity.

Depending on calciner enthalpy needs, the reheated circulating media is withdrawn at an appropriate controlled rate from combustor storage section (50) via multiple discharge ports, the flow through each discharge port being externally controlled by multiple high-temperature cone valves (51). The number of discharge ports and cone valves is between 4 (four) and 24 (twenty four), the exact amount a function of calciner and dryer enthalpy needs (media rate) and related fluid bed cross-sectional area. Such cone valves are well known to those familiar with bubbling fluid bed calciner design.

Reheated circulating media discharged from combustor storage section (50) via multiple cone valves (51) may contain some entrained fine ash. This ash if returned to the calciner with reheated circulating media may eventually contaminate the Kraft mill's recausticizing circuit. Therefore, the reheated media/ash mix first enters a "cone cap and slope" stripper (52) where the ash contaminated media flows downward, by gravity, over a series of cone caps and slopes (see detail "A" on the process flow diagram). Steam [63] at 2.07 bar (30 psia), or less, and pre-heated to 204° C. (400° F.) flows upward through the stripper, separating the ash from the downward flowing circulating media. Such designs are well known to those familiar with oil refinery fluid catalytic cracking design.

The ash/steam mixture [64] is vented into the combustor freeboard section, (49). Cleaned hot circulating media [65] at 843° C. and 927° C. (1550° F. and 1700° F.) is gravity discharged from the stripper (52) and reports to the fluid bed calcination section [66] via injectors [53] properly prepared to provide the calcination and drying steps net endothermic enthalpy need.

Ash and sulfated and un-sulfated limestone particles enter hot cyclone (67) via [62] where most of the incoming solids are separated from hot gaseous combustion products at 843° C. and 927° C. (1550° F. and 1700° F.). The cyclone solids underflow [68] enters silo (46) where it is split into two streams. One stream [45] is the previously mentioned solids recycle flow and the second [69] enters a small water-cooled disc cooler (70). Cooled solids [71] less than 93° C. (200° F.) then exits the system at this point.

The combustor is pre-heated on initial start-up by ambient temperature primary combustion air [72] heated to no greater than 816° C. (1500° F.) via oil or natural gas [73] in a direct-fired heater (74). When the fluidized media bed in fluid bed combustor lower section (15) reaches a suitable autogenic fuel combustion temperature, premium fuel (oil, gas, or coal) is injected [39] directly into the combustor bed to elevate its temperature to the desired operating temperature. Premium fuel use [39] is gradually disengaged as WWTP sludge, biomass, and/or fossil fuel feed commence.

Combustion Products Heat Recovery and Steam Generation

Solids and hot combustion products exiting the combustor are separated in a cyclone with ash exiting the system via a conventional rotary cooler. Largely cleaned, hot combustion products then enter multiple convective heat exchangers that, in counter-current series; superheat low pressure mill steam for calciner fluidization and internal calcination process service needs; generate high pressure superheated steam for export to the mill's steam loop, and preheated combustion air. Cooled combustion products exit to ambient via conventional gas clean-up devices.

Hot, ash laden combustion products [62] exiting combustor freeboard section (49) and entering cyclone (67) may be mixed with ammonia or urea [75] to reduce nitrogen oxide emissions with selective non-catalytic removal (SNCR) technology known to those familiar with fluidized bed boiler design. Should the nitrogen oxide content exiting combustor freeboard section (49) be less than that required by law, then this step is not required.

Hot, largely ash-free combustion products exiting cyclone (67) via [76] may be mixed with natural gas or oil [77] in incinerator (78) to increase the temperature to 982° C. (1800° F.) at a sufficient residence time in incinerator (78) such that any chlorinated organics (dioxins) can be destroyed. Some chlorinated organics may, or may not, be present in the WWTP sludge fuel and could transit the combustor without being destroyed. This technique is well known to those familiar with waste fuel combustor design. Should the dioxin content exiting combustor freeboard section (49) be less than that required by law, then this step will not be necessary.

Hot gases [79] exiting incinerator (78) enter gas/gas heat exchanger section (80) superheated low pressure saturated steam [81] from the mill at 2.07 bar (30 psia) to 538° C. (1000° F.). This super-heated low pressure steam is then largely directed into two (2) flows; most of it reports to the calciner inlet fluidizing gas plenum (82) via [83]. A smaller amount reports to the calcine cooler inlet fluidizing gas plenum (84) via [85].

The remaining super-heated low pressure steam is tempered with boiler feed-water [86] to 204° C. (400° F.) and directed into six (6) flows; via [87] to the calciner hot media injection valve, (53); via [59] to the combustor cool media injection valve, (38); via [63] to the combustor hot media stripper, (52); via [88] to the calciner cool media return stripper, (89); via [90] to the dry lime mud injection line, [91], and via [92] to the calcined lime mud re-injection line, [93]. Streams [90] [91] and [92] are all located on both FIGS. 4 and 5.

Cooled combustion products exit gas/gas heat exchanger section (80) and enter a second gas/gas heat exchanger section super-heater section (94) which superheats saturated high pressure steam [95] exiting steam drum (96) at between 104.5 bar (1515 psia) and 42.4 bar (615 psia). The superheated high pressure steam temperature will be between 538° C. (1000° F.) and 399° C. (750° F.) when exported to the Kraft pulp and paper mill's main steam loop via [97].

Cooled combustion products exit super-heater section (94) via stream [98] and enter forced-circulation boiler economizer/evaporator section (99). The steam/water mix [100] generated in economizer/evaporator section (99) enters steam drum (96) where saturated high pressure steam between 104.5 bar (1515 psia) and 42.4 bar (615 psia) exits via [95] and reports to super-heater section (94). Steam drum (96) saturated liquid underflow [101] is extracted and boosted to evaporation pressure by boiler circulation pump (102) being delivered via [103] to economizer/evaporator section (99). Pre-heated boiler feed-water, originally from the mill's boiler-house, enters steam drum (96) via [104] having been pre-heated in calcine cooler section (105). Stream [104] is depicted on FIGS. 4 and 5.

Still further cooled combustion products leaving economizer/evaporator section (99) via [106] are split into two streams, one entering primary air pre-heater section (107) and the second entering secondary air pre-heater section (108).

Primary air pre-heater section (107) pre-heats primary combustion air delivered via [109] by primary combustion air blower (110) at between 1.15 bar and 1.36 bar (16.7 psia to 19.7 psia). The primary combustion air exiting air pre-heater section (107) via [55] is heated to between 149° C. and 204° C. (300° F. to 400° F.) and then reports to combustor fluidizing air plenum (54).

Secondary air pre-heater section (108) pre-heats secondary combustion air delivered via [23] by secondary combustion air blower (111) at between 1.15 bar and 1.22 bar (16.7 psia to 17.7 psia). The secondary combustion air exiting (108) via [61] is heated to between 149° C. and 204° C. (300° F. to 400° F.) and then reports to fluid bed combustor transport section (48).

Finally, completely cooled combustion products exiting primary air pre-heater section (107) and secondary air pre-heater section (108) via [112] enter a fabric filter baghouse (113) where residual fine fuel ash and sulfated and unsulfated limestone are separated from combustion products. Ash [114] exits the system and ash-free combustion products are discharged to atmosphere via [115] by exhaust fan (116).

Steam Calcination of Dried Lime Mud $CO_2$ is liberated in a cylindrical steam fluidized "bubbling fluid bed" (BFB) calciner using inert hot media entering the calciner at a higher temperature than the calciner's operating bed temperature. Entering hot media releases its stored enthalpy as the endothermic heat load required to calcine dried lime mud to calcined lime mud product at the proper reaction conditions. Calciner fluidization steam enters at a controlled amount to insure that the gaseous $CO_2$-steam reaction atmosphere is continually maintained at a $CO_2$ partial pressure adequate to drive the calcination reaction. The $CO_2$-steam reaction atmosphere exiting the calciner is directed to a dryer to evaporate water associated with lime mud provided by the Kraft pulp and paper mill and has the proper enthalpy requirement to dry incoming lime mud at the lowest possible dryer outlet temperature and maximum relative water saturation.

Gravity delivered to the fluid bed calciner feed injectors (53) is hot, stripped media [65] at a rate dependent on the calciner's and dryer's endothermic enthalpy requirement. The hot media is motivated through the injectors by superheated low pressure steam [87] delivered to the injector's hot media entry point at 204° C. (400° F.). The injector is preferably an "L" valve design, but may also be of the "J" type. Such valve designs are well known to those familiar with fluidized bed design techniques.

Dried lime mud is transported [91] by a pressurized $CO_2$/super-heated steam mixture to the calciner media injector, (53) at a point downstream of the steam/hot media mixing point. Blower (117) (FIG. 4) receives export quality $CO_2$ [118] (FIG. 4) from the $CO_2$ product area (outside of the invention's battery limits) and pressurizes it to ensure that the injection pressure into the cylindrical calciner bed is not less than 1.57 bar (22.7 psia). Superheated steam is injected into [91] via [90].

The resulting steam/hot media/dry lime mud/$CO_2$ mixture is injected by calciner media injector (53) at a pressure not less than 1.57 bar (22.7 psia) into the base of cylindrical fluid bed calcination section (66) at a point directly above the calciner's circular gas distribution plate. The total number of injectors may vary from between four (4) and twenty-four (24) dependent on calcined lime mud production capacity and calciner distribution plate cross-sectional area.

Calcined lime mud in stream [93] is injected into fluid bed calcination section (66) at a pressure no less than 1.57 bar (22.7 psia) by mill steam [92] (FIG. 4) at 2.07 bar (30 psia), and 204° C. (400° F.). Calcined lime mud recycling ensures complete lime mud calcination while providing extra nucleation sites to mitigate sodium salt fouling in the calciner fluid bed. The amount of calcined lime mud entering via [93] is between 15% and 25% of the total calcined lime mud production rate dependent on actual need.

Calciner fluidization steam at 538° C. (1000° F.) is delivered [83] into the calciner fluidizing gas plenum (82). The steam pressure is not greater than 2.07 bar (30 psia) but at a pressure adequate to fluidize the bubbling media bed in fluid bed calcination section (66) at a fluidized bed height of no greater than 2.44 meters (8.0 feet). The steam amount entering calciner fluidizing gas plenum (82) will be controlled so as to ensure the $CO_2$ partial pressure in fluid bed calcination section (66) is no greater than 90% of the $CO_2$ equilibrium partial pressure at fluid bed calcination section (66)'s maximum fluidized bed pressure and minimum fluidized bed temperature when also considering steam/$CO_2$ mixtures contained in calciner input streams [59], [91], [87] and [93]. Lastly, the total enthalpy, when considering temperature and mass amounts, contained in all gases exiting in stream [119] will be sufficient to satisfy the lime mud drying step's requirement.

Fluid bed calcination section (66) is fluidized at the distributor plate top by steam at a velocity greater than the circulating media's incipient fluidization velocity but less than its maximum transport velocity of 6.1 mps (20 fps) and always greater than the largest calcined lime mud particle's transport velocity.

Fluid bed calcination section (66) expands in cylindrical cross-sectional area as $CO_2$ is liberated by the calcination reaction and stops expanding at calciner freeboard section (120) entry point. This increasing cross-sectional area insures that the $CO_2$/steam gas mixture exits fluid bed calcination section (66) and enters calciner freeboard section (120) at a velocity greater than the media's incipient fluidization velocity but less than its minimum transport velocity but always greater than the largest calcined lime mud particle's transport velocity. This ensures that elutriated calcined lime mud is transported into calciner freeboard section (120) and media is disengaged from the calcined lime mud, falls back, and returns to fluid bed calcination section (66).

Cooled media exits the calciner through a gravity discharge overflow port located at the interface of fluid bed calcination section (66) and calciner freeboard section (120), i.e., the top surface of the calciner bubbling fluid bed. Media discharged from fluid bed calcination section (66) may contain some entrained calcined lime mud. This calcined lime mud, if returned to the combustor with the media will create an economic loss. Therefore, the media/calcined lime mud mix enters a "cone cap and slope" stripper (89) where the media/calcined lime mud mix flows downward, by gravity, over a series of cone caps and slopes (see detail "A" on the process flow diagram). Steam [88] at 2.07 bar (30 psia), or less, and pre-heated to 204° C. (400° F.) flows upward through the stripper, separating calcined lime mud from the downward flowing media. Such stripper designs are well known to those familiar with refinery fluid catalytic cracking design techniques. The stripped calcined lime mud and associated steam enter calciner freeboard section (120).

Cool, stripped media exits "cone cap and slope" stripper (89) via discharge stream [57], and is combined with make-up media [37] and recovered media [58] with all reporting to the media return valve (38). Valve (38) returns media to fluid bed combustor lower section (15) as previously explained. Valve (38) is preferably a "J" type valve but may also be an "L" type valve. Such valve designs are well known to those familiar with fluidized bed design techniques.

The number of strippers (89) and valves (38) will be not less than two (2) to ensure proper distribution of returned media into the fluid bed combustor lower section (15).

Calcined lime mud particles elutriated into the calciner freeboard section (120) represent the total calcined lime mud production rate. This calcined lime mud, along with the exiting $CO_2$/steam gas mixture, exits calciner freeboard section (120) via stream [119] prior to entering hot cyclone (121).

The calcined lime mud particle temperature in both fluid bed calcination section (66) and calciner freeboard section (120) will be not less than 760° C. (1400° F.) and not greater than 854° C. (1570° F.) and typically between 791° C. (1455° F.) and 800° C. (1472° F.). Hot media entering fluid bed calcination section (66) via injectors (53) will be not less than 832° C. (1530° F.) and not greater than 927° C. (1700° F.). Cooled media entering media stripper (89) will typically be 28° C. (50° F.) higher than the exiting calcined lime mud particle entering calciner freeboard section (120). This will ensure rapid heat transfer between the incoming hot media and the incoming dried lime mud.

The entire cylindrical calciner vessel represented by sections (82), (66), and (120) will surround combustor cylindrical, or rectangular, fluid bed combustor transport section (48). The combustor storage section (50) will share a common floor/roof with calciner freeboard section (120). In this manner the calciner and combustor are integrated into a compact, vertical design to minimize land area requirements. All interior surfaces of the calciner and combustor will be refractory lined for abrasion resistance and thermal insulation purposes. Such designs are well known to those familiar with fluidized bed design techniques.

Lime Mud Drying

There are two lime mud drying routes that can be utilized. The use of either drying route is primarily a function of desired $CO_2$ product quality, initial lime mud moisture content, and overall fuel cost. A spray dryer can be used when $CO_2$ quality in excess of 95% purity is required and when the lime mud moisture content received from the mill is 30% or more, although higher solids content lime muds, when water diluted, are acceptable. This drying route consumes the highest amount of fuel fed to the combustor. A flash dryer can be used when $CO_2$ quality in excess of 90% is required and/or with lime mud moisture contents less than 30% up to the maximum solids content produced by the lime mud filtration system. This drying route consumes the lowest amount of fuel. The spray dryer route is depicted on FIG. 4 and the flash dryer route on FIG. 5.

Spray Dryer Route

In accordance with FIG. 3, the hot $CO_2$, steam, and elutriated calcined lime mud product mixture exiting calciner freeboard section (120) via [119] is largely cleaned of calcined lime mud in a hot cyclone (121). Separated larger particle calcined lime mud, representing most of the calcined lime mud production rate, exits cyclone (121) via [122] where it enters the first stage of the first fluid bed cooler section, (123).

The hot $CO_2$/steam gas and very fine particle calcined lime mud mixture exits cyclone (121) via [124] and reports to the spray dryer entering via vertical "air disperser" duct (125) that rises through spray dryer conical chamber (126) and cylindrical chamber (127) terminating at a point beneath the rotary disc atomizer, (128). Hot drying gases and fine particle calcined lime mud exit air disperser duct (125) via a vaned, or non-vaned, opening, a.k.a. a "chimney air disperser".

The rotary atomizer (128) utilizes an abrasion-resistant spinning disc to atomize the lime mud slurry [129] into very fine droplets. This slurry is a pumpable lime mud/water mixture at no less than 65% and typically 70% total solids content. The resultant fine droplet cloud is immediately contacted by the dispersed entering hot gases [124] exiting air disperser duct (125) and is instantaneously converted into fine dry particles and vaporized water.

Both the air disperser duct and atomizer designs referred to are those offered by GEA Niro, Copenhagen, Denmark. Such techniques are well known to those familiar with designers of high tonnage spray drying systems for minerals processing.

The rapid evaporation process immediately quenches gases in the cylindrical chamber (127), and conical chamber (126), to a temperature no less than 91° C. (195° F.) and no greater than 104° C. (220° F.) dependent on the entering gas temperature and composition, lime mud slurry [129] total solids content, and the need to maintain a dry particle moisture content at no greater than 2% by weight. At these conditions most, if not all, of the NaOH present in the lime mud slurry will be converted to $Na_2CO_3$ due to the $CO_2$ content and temperature in the drying chamber.

A very small portion of the CaO contained in the calcined lime mud entering the dryer with the hot gases via [124] is also rehydrated and recarbonated to $Ca(OH)_2$ and $CaCO_3$ due to the $CO_2$/water vapor mixture present in the drying chamber. These solids are mixed with dry lime mud reporting to the calciner where it is re-calcined.

The coarse particle size dry lime mud portion is captured in conical chamber (126) and gravity discharged via a rotary valve through exit duct [130] and reports to the dry lime mud storage silo, (131). This separation technique is well known to those familiar with designers of high tonnage spray drying systems for minerals processing.

Remaining dry lime mud, representing finer particle sizes, exit conical chamber (126) with the cooled $CO_2$/water vapor mixture via [132] and report to the dryer cyclone (133) which separates larger dry lime mud particles that then exit the cyclone base via a rotary valve and duct [134] and report to dry lime mud storage silo (131).

Gases [135] exiting dryer cyclone (133), containing the finest residual dry lime mud particles, enter a fabric bag-house filter, or electrostatic precipitator (ESP), (136). These separated dry lime mud particles exit (136) via a rotary valve and duct [137] and report to the dry lime mud storage silo, (131).

The collected spray dried lime mud in silo (131) is discharged from its conical silo base through a multiplicity of discharge valves numbering no less than four (4) and no greater than twenty four (24) but always a number equivalent to the number of calciner hot media/dried lime mud injectors, (53). Blower (117) receives $CO_2$ vapor from the $CO_2$ product storage area (beyond this invention's battery limits) and boosts it to a pressure satisfactory to transport the dry lime mud that exits dry lime mud storage silo (131) to injectors (53) to ensure that the injector discharge pressure entering calciner section (66) is no less than 1.57 bar (22.7 psia).

Dry lime mud free gases exiting (136) are extracted by exhaust gas fan (138) that then deliver this $CO_2$/water vapor mixture [139] gas to a conventional direct contact water scrubber that largely separates the water vapor from all entering gases. Fan (138), and stream [139], are located on both FIGS. 4 and 5.

Flash Dryer Route

Unless otherwise noted, all stream numbers are depicted on FIG. 5. In accordance with FIG. 3, The hot $CO_2$, steam, and elutriated calcined lime mud product mixture exiting the calciner via [119] is largely cleaned of calcined lime mud in cyclone (121). Separated larger particle calcined lime mud, representing most of the calcined lime mud production rate, exits cyclone (121) via [122] where it enters first fluid bed cooler section, (123) which is located on both FIGS. 4 and 5.

Exiting cyclone (121) via [124] is a hot $CO_2$/steam and residual fine particle calcined lime mud mixture at 760° C. (1400° F.) to 854° C. (1570° F.). Intercepting stream [124] is stream [183] that is a pressurized dense phase mixture of $CO_2$ and cooled calcined lime mud having first been discharged from fluid bed calcined lime mud cooler section (180) via [179] at approximately 93° C. to 121° C. (200° F. to 250° F.) with blower (198) providing injection/transport $CO_2$ via stream [197] from the $CO_2$ product area (outside of the invention's battery limits). This stream interception causes stream [124] to be tempered ("quenched") to no greater than 593° C. (1100° F.) in the tempering cyclone, (184). Lowering the temperature ensures that flash dryer (185) effectively operates without mechanical or process problems.

Separated, and reheated, calcined lime mud at a temperature somewhat less than 593° C. (1100° F.), exits tempering cyclone (184) via [186] and enters the first fluid bed cooler section, (123).

The cooled $CO_2$/steam and fine particle calcined lime mud mixture exits the tempering cyclone (184) at no greater than 593° C. (1100° F.) via a stream [187]. Intercepting stream [187] is emergency quench $CO_2$ [188] from the $CO_2$ product area (outside of the invention's battery limits) and, if needed, emergency quench water [189] to ensure that the hot gases and residual fine particle calcined lime mud entering flash dryer (185) do not exceed 593° C. (1100° F.).

Prepared lime mud [190] exiting the pug-mill feeder (191) enters the flash dryer (185) at a point above the gas stream [187] entry point. This lime mud is dispersed into gas stream [187] by appropriate means to ensure that rapid water evaporation in the flash dryer (185) occurs at a temperature no less than 96° C. (205° F.) and no greater than 104° C. (220° F.) dependent on the entering gas temperature, total lime mud solids content, and the need to maintain a dried particle moisture content at no greater than 2% by weight. At these conditions most, if not all, of the NaOH present in the entering lime mud is converted to $Na_2CO_3$ due to the $CO_2$ content and temperature in the flash dryer (185).

A very small portion of the CaO contained in the calcined lime mud entering flash dryer (185) via [124] is rehydrated and recarbonated to $Ca(OH)_2$ and $CaCO_3$ due to the $CO_2$/water vapor mixture present in the dryer. These solid are commingled with dry lime mud which eventually reports to the calciner where it is recalcined.

The dry lime mud and cooled $CO_2$/water vapor mixture exiting the flash dryer (185) via exit duct [132] reports to dryer cyclone (133). Dryer cyclone (133) separates entering larger dry lime mud particles that then exit the cyclone base via a rotary valve and duct [134] and then report to the dry lime mud storage silo, (131).

Gases exiting dryer cyclone (133), which contain the residual finest dry lime mud particles, enter a fabric bag-house filter, or electrostatic precipitator (ESP), (136) via [135]. The separated dry lime mud particles exit bag-house filter or ESP (136) via a rotary valve and [137] and then report to the dry lime mud storage silo, (131).

The collected dry lime mud in dry lime mud storage silo (131) is discharged from its conical silo base through a multiplicity of discharge valves (between 4 and 24 in number) but always a number equivalent to the number of calciner hot media/dried lime mud injectors, (53). A blower (117) receives $CO_2$ vapor from the $CO_2$ product storage area (beyond this invention's battery limits) via [118] and boosts it to a pressure satisfactory to transport solids exiting dried lime mud storage silo (131) to hot media/dried lime mud injectors (53) to ensure an injector discharge pressure entering the fluid bed calcination section (66) is no less than 1.57 bar (22.7 psia).

Dry lime mud free gases exiting bag-house filter or ESP (136) are extracted by an exhaust gas fan (138) that delivers this $CO_2$/water vapor mixture gas to a conventional direct contact water scrubber that largely separates the water vapor from all entering gases.

Carbon Dioxide Recovery

The $CO_2$ recovery process island description is the same for either the spray dryer or flash dryer route and is depicted on both FIGS. 4 and 5. The cleaned $CO_2$/water vapor mixture leaves the bag-house filter or ESP (136) via an exhaust fan (138) and reports to the direct contact water scrubber lower contact stage (141) via [139]. This direct contact water scrubber uses mill cooling tower water [140] entering at approximately 38° C. (100° F.) and fresh mill water (142) at approx. 10° C. (50° F.) in its upper contact stage (143). This type design is well known to those familiar with the practice of purifying industrial gas streams.

The counter-current direct contact between cooling water and incoming hot gas further removes residual lime mud particles and condenses water vapor to concentrate $CO_2$ in the water scrubber's exhaust gas stream [144] to a saturation temperature of approximately 16° C. (60° F.). This low temperature, water-saturated $CO_2$ gas stream reports to a facility (beyond this invention's battery limits) designed to remove residual gaseous/solid impurities and create a marketable liquid or gaseous $CO_2$ product. This technology is well known to those in the industrial gas industry.

Rejected scrubber water and small amounts of hydrated calcined lime mud [145] is collected in the direct contact scrubber sump at approximately 82° C. (180° F.) and reports to a collection tank, (146). The vent gas [147] from (146) contains some $CO_2$ that is directed to the direct contact scrubber exhaust gas stream [144].

For both the spray and flash dryer routes the collected, rejected calcined lime mud free hot water in collection tank (146) then flows to the mill's recausticizing circuit via [148] for dilution and washing purposes. This is as depicted in FIG. 5. For the spray dryer route, hot water with hydrated calcined lime mud underflow [149] reports to tank (150).

Lime Mud Preparation

The lime mud preparation island is different for each drying route and is depicted on FIG. 4 for the spray dryer route, and FIG. 5 for the flash dryer route. The spray dryer route requires a liquid, pumpable feedstock whereas the flash dryer route can accept a relatively dryer filter cake produced in the manufacturing operation.

Spray Dryer Route

Unless otherwise noted, all stream numbers are depicted on FIG. 4. Pumpable lime mud slurry for the spray dryer atomizer is prepared in open top stirred tank (150) when lime mud filter cake [151] at up to 90% solids content is fed via screw feeder (152) and mixed with hot water and residual hydrated calcined lime mud reporting from the direct contact scrubber via [149]. The total solids content in open top stirred tank (150) is controlled to no less than 65% but typically 70% to ensure easy pumping and atomization. The actual lime mud slurry water content will be a function of a specific mill's recausticizing circuit operations.

A sufficient amount of liquid $H_2O_2$ or gaseous $O_2$ [153] is also added to open top stirred tank (150) to fully oxidize trace, residual amounts of $Na_2S$ in the stirred slurry into $Na_2SO_4$. This conversion prevents contaminating $CO_2$ product gas [144] with gaseous total reduced sulfur (TRS) compounds that could be generated in the spray dryer or calciner. This also helps to mitigate scaling and fouling in the calciner by altering the $Na_2CO_3/Na_2SO_4$ mass ratio into a higher melting point region.

A small amount of $Na_2SO_4$ or $Na_2CO_3$ solution [154] may also be added to mitigate scaling and fouling in the calciner by altering the $Na_2CO_3/Na_2SO_4$ mass ratio into a higher melting point region.

There are multiple open top stirred tanks (150) to ensure consistent adjustment of total solids content and sodium salt composition and content prior to transfer [155] to the enclosed stirred feed tank, (156) via the pump (157). Final corrective amounts of liquid $H_2O_2$ or gaseous $O_2$ may be added via [158] into pump (157).

The enclosed stirred feed tank, (156) receives prepared lime mud slurry from open top stirred tank (150) via [155]. Sweep steam [159] is added to the enclosed stirred feed tank (156) freeboard to remove any entrained residual air vented to ambient via vent (160). The prepared lime mud slurry is then pumped via stream [129] by a positive displacement pump (161) to the spray dryer rotary atomizer (128) at a variable, but controlled rate considering the product moisture content and the drying gas composition and temperature.

Flash Dryer Route

Unless otherwise noted, all stream numbers are depicted on FIG. 5. Flash dryer (185) lime mud feed is prepared in a pug mill feeder (191) when lime mud filter cake [192] at up to 90% total solids content is mixed with a sufficient amount of liquid $H_2O_2$ [193] to oxidize trace, residual amounts of $Na_2S$ in the lime mud into $Na_2SO_4$. This conversion prevents contaminating the $CO_2$ product gas [144] with gaseous total reduced sulfur (TRS) compounds that could be generated in the flash dryer or calciner and helps to mitigate scaling and fouling in the calciner by altering the $Na_2CO_3/Na_2SO_4$ mass ratio into a higher melting point region.

A small amount of $Na_2SO_4$ or $Na_2CO_3$ solution [194] may also be added to mitigate scaling and fouling in the calciner by altering the $Na_2CO_3/Na_2SO_4$ mass ratio into a higher melting point region.

The total solids content exiting pug mill feeder (191) via stream [190] is slightly reduced from the maximum 90% total solids present in lime mud filter cake [192] with the addition of liquid $H_2O_2$ [193] and $Na_2CO_3/Na_2SO_4$ solution [194]. This exiting lime mud solids content in stream [190] should be maintained at no less than 85% to ensure proper feeding and dispersion into the flash dryer (185) and is accomplished by adding dry lime mud [195] to pug mill feeder (191) that has been re-cycled from dry lime mud storage silo (131) via mechanical means.

The lime mud feed rate to the flash dryer (185) from pug mill feeder (191) is controlled to maintain a constant dried lime mud product moisture content considering the interrelationship of the actual flash dryer inlet drying gas composition and temperature. Surge dry solids are stored in dry lime mud silo (131). This control technique is well known to those familiar with the practice of industrial flash drying.

Calcine Cooling and Pelletizing

The calcined lime mud cooling and pelletization island description is essentially the same for both drying routes as depicted on FIGS. 4 and 5, except for several variations, which are depicted in FIG. 5 for the flash dryer route. Hot calcined lime mud [122] discharged from cyclone (121) and reheated calcined lime mud [186] discharged from the tempering cyclone (184) (when using the flash dryer route) report to a rectangular fluid bed cooler section (123) via a dip-leg seal. First fluid bed cooler section (123) is fluidized by steam [85] entering via first fluid bed cooler plenum section (84) at 2.07 bar (30 psia) and 538° C. (1100° F.) to ensure a proper seal between the cyclone dip-leg and ambient. Therefore, any gas drawn up into the negative pressure cyclones (121) and (184) is steam which will not contaminate the $CO_2$ recovery loop.

The first fluid bed cooler section (123) is a "back-mix" fluidized bed design to ensure uniform mixing of fluidization steam and entering hot calcined lime mud. The equilibrium temperature in the first fluid bed cooler section (123) is no less than 600° C. (1112° F.) to ensure that no calcined lime mud re-hydration occurs. The calcined lime mud exits first fluid bed cooler section (123) by flowing over a full bed width divider wall and enters second fluid bed cooler section (105). Fluidization steam exits through the same divider wall opening, drawn by the negative draft created by cooler exhaust fan (162).

A portion of hot calcined lime mud exits first fluid bed cooler section (123) via an overflow weir into a discharge port [163] at a controlled rate via a cone valve. The amount of calcined lime mud entering [163] is between 15% and 25% of the total calcined lime mud production rate and is injected [93] into fluid bed calcination section (66) to ensure complete lime mud calcination while also mitigating sodium salt fouling affects in the calciner fluid bed.

Calcined lime mud entering the second fluid bed cooler section (105) is fluidized by ambient air [165] delivered by a blower (166) through second fluid bed cooler plenum section (167). The fluidized calcined lime mud flows down the rectangular bed around immersed tube bundles within the fluidized bed. Flowing through this tube bundle, counter-flow to the solids flow, is pressurized mill boiler feed-water entering via [168]. Boiler feed-water, now heated to a higher temperature, exits via stream [104] and reports to the inlet of the steam drum (96). Excess heated boiler feed-water exits via stream [169] and reports to the mill's boiler-house. Cooled calcined lime mud exits second fluid bed cooler section (105) by flowing over a full bed width divider wall before entering third fluid bed cooler section (164).

Calcined lime mud entering third fluid bed cooler section (164) is fluidized by ambient air [165] delivered by a blower (166) through third fluid bed cooler section plenum (170). The fluidized calcined lime mud flows along the rectangular fluid bed path around immersed tube bundles within the fluidized bed. Fresh mill water [171] flows through this tube bundle, counter-flow to the solids flow, boosted in pressure by a pump (172). Hot water exits via stream [173] and reports to the mill hot water system or recausticizing circuit for dilution and washing.

Instead of counter-flow pipe bundles, cross-flow plates or pipe bundles may also be utilized in fluid bed cooler sections (105) and (164), or another indirect heat transfer device known to those familiar with this type fluid bed cooler.

The steam/air mixture in the fluid bed cooler freeboard is withdrawn by an exhaust fan (162) via stream [174]. This exhaust stream reports to a fabric filter baghouse (175) and then exhausts to ambient via stream [176]. Collected fine particulate calcined lime mud [178] reports with the bulk cooler calcine flow [179] as stream [180] to the inlet of the pelletizer (181).

The cooled calcined lime mud, at approximately 93° C. to 121° C. (200° F. to 250° F.), exits the third fluid bed cooler section (164) via an overflow weir (180) with the rate controlled by a rotary valve. The product calcine is highly reactive since the low-temperature calcination process creates a "soft-burned" product. Its fine particle size also makes it dusty. Therefore the calcined lime mud is pelletized in pelletizer (181) to mitigate potential handling and safety problems before being transported via [182] to the mill recausticizing circuit's slakers.

As depicted on FIG. 5, with the flash dryer route a portion of this cooled calcined lime mud [179] is extracted at a controlled rate [196] by a rotary valve and is pneumatically transported via $CO_2$ [183] to the tempering cyclone (184) inlet gas line [124]. This $CO_2$ is obtained from the $CO_2$ preparation area (outside of this process) via stream [197] and is boosted in pressure by blower (198).

While the present invention has been exemplified by specific embodiments, it will be understood in view of the present disclosure that numerous variations upon the invention are now enabled to those skilled in the art. Accordingly, the invention is to be broadly construed and limited only by the scope of the present disclosure.

The invention claimed is:

1. A system effective to recover carbon dioxide of 90% to +99% purity comprising a bubbling fluid bed calciner thermally linked by an apparatus or system to a circulating fluid bed combustor, and a dryer selected from the group consisting of a spray dryer and a flash dryer, wherein the dryer and the calciner operate in countercurrent gas/solids flow and wherein wet calcium carbonate is dried by exiting calciner gases and the resulting dry calcium carbonate is fed to the calciner.

2. A system according to claim 1 wherein the dryer is a spray dryer.

3. A system according to claim 1 wherein the dryer is a flash dryer.

* * * * *